(12) United States Patent
Katayama et al.

(10) Patent No.: US 7,379,582 B2
(45) Date of Patent: May 27, 2008

(54) THREE-DIMENSIONAL STRUCTURE VERIFICATION SUPPORTING APPARATUS, THREE-DIMENSIONAL STRUCTURE VERIFICATION METHOD, RECORDING MEDIUM, AND PROGRAM THEREFOR

(75) Inventors: Eisaku Katayama, Tokyo (JP); Norio Baba, Tokyo (JP)

(73) Assignee: Toudai TLO, Ltd., Tokyo (JP)

( * ) Notice: Subject to any disclaimer, the term of this patent is extended or adjusted under 35 U.S.C. 154(b) by 963 days.

(21) Appl. No.: 10/660,464

(22) Filed: Sep. 11, 2003

(65) Prior Publication Data

US 2004/0114806 A1    Jun. 17, 2004

Related U.S. Application Data

(63) Continuation of application No. PCT/JP02/01069, filed on Feb. 8, 2002.

(30) Foreign Application Priority Data

Mar. 12, 2001    (JP) .............................. 2001-068232

(51) Int. Cl.
*G06K 9/00*    (2006.01)

(52) U.S. Cl. ..................... 382/154; 345/419; 356/12; 348/42

(58) Field of Classification Search ................ 382/154; 345/419–427; 356/12–14; 348/42–60; 359/462–477
See application file for complete search history.

(56) References Cited

U.S. PATENT DOCUMENTS 5,808,735 A * 9/1998 Lee et al. ................. 356/237.2

(Continued)

FOREIGN PATENT DOCUMENTS

JP    62-219075    9/1987

(Continued)

OTHER PUBLICATIONS

Office Action mailed Jun. 1, 2004 in corresponding Japanese Application 2002-574592, 3 pages, with English translation, 4 pages.

(Continued)

*Primary Examiner*—Aaron W Carter
(74) *Attorney, Agent, or Firm*—Osha•Liang LLP

(57) ABSTRACT

A projection image data captured from a plurality of angles is processed, and a three-dimensional image data accurately indicating a three dimensional structure for an object is obtained. A shape computing unit 260 computes shape data indicating an outline of a subject using a plurality of first image data of the subject captured from a plurality of angles. A distributing unit 220 generates a gray-scale density-distribution by extending and distributing density indicated in a gray-scale image of the subject acquired by a projection image capturing apparatus to an angle at which the gray-scale image is captured. The second integrating unit 240 generates a three-dimensional gray-scale data indicating the subject with three-dimensional image data by integrating a plurality of gray-scale images acquired from a plurality of angles and a plurality of gray-scale density-distribution. The first integrating unit 280 integrates the three-dimensional gray-scale image and shape data. The data processing unit 300 generates the three-dimensional image data by extracting only the gray-scale data which exists in the circumference of the shape indicated in the shape data from the three-dimensional gray-scale data.

34 Claims, 18 Drawing Sheets

U.S. PATENT DOCUMENTS

2005/0190181 A1* 9/2005 Sakagawa et al. .......... 345/419

FOREIGN PATENT DOCUMENTS

| JP | 4-70983 | 3/1992 |
|---|---|---|
| JP | 5-73663 | 3/1993 |
| JP | 05-165969 | 7/1993 |
| JP | 5-165969 | 7/1993 |
| JP | 7-234268 | 9/1995 |
| JP | 8-292164 | 11/1996 |
| JP | 2000-40146 | 2/2000 |
| JP | 2000-82142 | 3/2000 |
| JP | 2000-222428 | 8/2000 |

OTHER PUBLICATIONS

Patent Abstracts of Japan, Publication No. 04-070983 dated Mar. 5, 1992, 2 pgs.
Patent Abstracts of Japan, Publication No. 62-219075 dated Sep. 26, 1987, 2 pages.
Patent Abstracts of Japan, Publication No. 8-292164 dated Nov. 5, 1996, 2 pgs.
Patent Abstracts of Japan, Publication No. 2000-082142 dated Mar. 21, 2000, 2 pgs.
Patent Abstracts of Japan, Publication No. 2000-040146 dated Feb. 8, 2000, 2 pgs.
Patent Abstracts of Japan, Publication No. 05-073663 dated Mar. 26, 1993, 2 pgs.
Patent Abstracts of Japan, Publication No. 05-165969 dated Jul. 2, 1993, 2 pgs.
English Translation of International Preliminary Examination Report datd Jan. 27, 2003 (6 pgs.).
Patent Abstracts of Japan; Publication No. 2000-222428 dated Aug. 11, 2000 (1 pg.).
Patent Abstracts of Japan; Publication No. 05-165969 dated Jul. 2, 1993 (1 pg.).
Patent Abstracts of Japan; Publication No. 07-234268 dated Sep. 5, 1995 (1 pg.).
Publication WO 02/075658 A1 dated Sep. 26, 2002 (2 pgs.).
International Search Report dated Mar. 26, 2002 (3 pgs.).
International Preliminary Examination Report dated Jan. 27, 2003 (4 pgs.).

* cited by examiner

THREE-DIMENSIONAL STRUCTURE VERIFICATION SUPPORTING APPARATUS, THREE-DIMENSIONAL STRUCTURE VERIFICATION METHOD, RECORDING MEDIUM, AND PROGRAM THEREFOR

The present application is a continuation application of PCT application No. PCT/JP02/01069 filed on Feb. 8, 2002, which claims priority from a Japanese patent application No. 2001-68232 filed on Mar. 12, 2001, the contents of which are incorporated herein by reference.

BACKGROUND OF THE INVENTION

1. Field of the Invention

The present invention relates to a three-dimensional structure verification supporting apparatus, a three-dimensional structure verification method, a record medium, and a program.

2. Related Art

In order to settle structural analysis of a substance with high spatial resolving power, it is indispensable to apply a structural analysis method, such as X-ray diffraction or a multidimensional NMR method. In order to apply the X-ray diffraction to a certain substance, it is indispensable that the substance has to be firmly crystallized and the phase can be determined by isomorphous replacement or the like. Moreover, in order to apply the multidimensional NMR method to a certain substance, it is indispensable that the molecular weight of the substance is not so high and that a large quantity of high concentrated samples with high solubility is acquirable.

For a substance which does not fulfill the above-mentioned conditions, structural analysis of the substance has to be done with an electron microscope. However, it is difficult to analyze and determine the three-dimensional structure of single molecule by a widely used cryo-electron microscopic method because its contrast is low and the substance is damaged by irradiation of an electron beam.

In particular, in case that a plurality of molecules form a complex or in case that the structure is changing during performance of a certain function, even if the structure of each molecule is known, there is no means for analyzing properly how the plurality of molecules are arranged or how the molecular structure changes during performance of the function. In such a case, there is no choice but to build a virtual model presuming the most probable structure from existing circumstantial evidences. However, it has been impossible to verify the properness of the virtual model.

SUMMARY OF THE INVENTION

Therefore, it is an object of the present invention to solve such a problem.

In order to achieve these desired objectives, according to a first aspect of the present invention, there is provided a three-dimensional structure verification supporting apparatus for supporting verification of a three dimensional structure by verifying properness of a three-dimensional image indicating the three dimensional structure of a substance. The three-dimensional structure verification supporting apparatus includes: a comparison image generating unit for generating a three-dimensional comparison image by adjusting image quality of the three-dimensional image with image quality of a reference image of the substance which is obtained experimentally; and a degree-of-image coincidence computing unit for computing degree of image coincidence between the three-dimensional comparison image and the reference image of the substance.

In the first aspect, the comparison image generating unit may generate the three-dimensional comparison image by blurring the three-dimensional image in accordance with image quality of the reference image of the substance. The comparison image generating unit may generate the three-dimensional comparison image in accordance with the image quality of the reference image of the substance which is obtained experimentally by adjusting the image quality so that the degree of image coincidence between a three-dimensional image of a reference substance, of which a structure is known, and the reference image of the reference substance obtained by experimental structural analysis becomes the greatest.

The three-dimensional image may be the three-dimensional simulated image simulated in order to indicate three-dimensional structure of a substance. In this case, the three-dimensional structure verification supporting apparatus may further include a simulated-image supply unit for supplying the comparison image generating unit with the plurality of three-dimensional simulated images indicating a plurality of structures which are to be formed by the substance. The comparison image generating unit may generate the three-dimensional comparison image for each of the plurality of three-dimensional simulated images, and the degree-of-image-coincidence computing unit may compute the degree of image coincidence for each of the plurality of three-dimensional comparison images. In this case, the three-dimensional structure verification supporting apparatus may further include a structure data base storing thereon data indicating the plurality of structures, which are to be formed by the substance, as images, and the simulated-image supply unit may acquire the three-dimensional simulated image using the data stored on the structure data base, and may provide it to the comparison image generating unit. Moreover, the three-dimensional structure verification supporting apparatus may further include a selection unit for selecting data for specifying a structure of a substance corresponding to the three-dimensional comparison image, of which the degree of image coincidence is judged to be the greatest, from a plurality of data specifying the plurality of structures. In the latter case, the comparison image generating unit may further generate the plurality of three-dimensional comparison images captured from a plurality of angles for each of the plurality of structures, the degree-of-coincidence computing unit may compute degree of image coincidence between each of the plurality of three-dimensional comparison images captured from a plurality of angles, and the reference image of the substance captured from the same angle as each of the plurality of three-dimensional comparison images, for each of the plurality of structures, and the selection unit may judge acceptability of the degree of image coincidence using the result of the statistical application of the plurality of degrees of image coincidence for a plurality of angles.

When the three-dimensional simulated image computed in order to indicate the three dimensional structure of the substance is to be used as the three-dimensional image, the three-dimensional structure verification supporting apparatus may further include a three-dimensional reconstruction image generating unit for generating a three-dimensional reconstruction image, which is a reference image of the substance, by processing a plurality of gray-scale images acquired by a transmission electron microscope.

The three-dimensional structure verification supporting apparatus may further include: a three-dimensional reconstruction image generating unit for generating a three-dimensional reconstruction image by processing a plurality of gray-scale images acquired by a transmission electron microscope; and a shading unit for generating a three-dimensionally shaded image, which is the three-dimensional image, by shading the three-dimensional reconstruction image. The comparison image generating unit may generate the three-dimensional comparison image using the three-dimensionally shaded image; and the degree-of-coincidence computing unit may utilize the gray-scale image acquired by a transmission electron microscope as a reference image of the substance. In this case, the three-dimensional reconstruction image generating unit may turn the three-dimensional reconstruction image to an angle at which one of the plurality of gray-scale images is captured, and the degree-of-coincidence computing unit may compute the degree of image coincidence between the three-dimensional comparison image and the one of the gray-scale images. In this case, the comparison image generating unit may further generate the plurality of three-dimensional comparison images corresponding to the plurality of gray-scale images, the degree-of-coincidence computing unit may compute the plurality of degrees of image coincidence using the plurality of three-dimensional comparison images, and the three-dimensional structure verification supporting apparatus may further include an instruction unit for statistically processing the plurality of degrees of image coincidence and instructing the three-dimensional reconstruction image generating unit to adjust reconstruction condition of the three-dimensional reconstruction image using the processing result.

When the three-dimensional reconstruction image is needed, the three-dimensional structure verification supporting apparatus may further include a three-dimensional reconstruction image generating unit, including: a shape computing unit for computing shape data indicating an outline of the substance using the gray-scale images captured from a plurality of angles; a distributing unit for generating a gray-scale density-distribution by extending and distributing density indicated in the plurality of gray-scale images to the angles at which the gray-scale images are captured, respectively; a second integrating unit for generating three-dimensional gray-scale data by integrating the plurality of gray-scale density-distribution generated from the plurality of gray-scale images captured from the plurality of angles and indicating the substance by three-dimensional image data; a first integrating unit for integrating the three-dimensional gray-scale data generated by the second integrating unit and the shape data; and a data processing unit for generating the three-dimensional reconstruction image from the three-dimensional gray-scale data by extracting only the gray-scale data which exists in a circumference of a shape indicated by the shape data. Moreover, the three-dimensional structure verification supporting apparatus may further include a three-dimensional reconstruction image generating unit, including: a shape computing unit for computing shape data indicating the outline of the substance using the gray-scale images captured from a plurality of angles; and an image data generating unit for generating the three-dimensional reconstruction image by distributing the gray-scale data of the gray-scale images around the outline.

The three-dimensional structure verification supporting apparatus may further include: a comparison position data acquiring unit for acquiring a plurality of comparison position data indicating positions of a plurality of parts of the substance in the three-dimensional image; and a reference position data acquiring unit for acquiring a plurality of reference position data indicating positions of the plurality of parts in the reference image. The degree-of-image-coincidence computing unit may compute the degree of image coincidence using the plurality of comparison position data and the plurality of reference position data. In this case, the three-dimensional structure verification supporting apparatus may further include a scaling unit for scaling one of the plurality of comparison position data and the plurality of reference position data into a state where the three-dimensional image or the reference image is expanded or reduced. The degree-of-image-coincidence computing unit may compute the degree of image coincidence using the one of the plurality of comparison position data and the plurality of reference position data scaled by the scaling unit, and the other one of the plurality of comparison position data and the plurality of reference position data.

Moreover, the three-dimensional structure verification supporting apparatus may further include a rotation unit for rotating one of the plurality of reference position data and the plurality of comparison position data into a state where the three-dimensional image or the reference image is rotated. The degree-of-image-coincidence computing unit may compute the degree of image coincidence using the one of the plurality of comparison position data and the plurality of reference position data rotated by the rotating unit, and the other one of the plurality of comparison position data and the plurality of reference position data.

Moreover, a three-dimensional simulated image computed by modeling may be utilized for indicating three dimensional structure of the substance as the three-dimensional image, and a three-dimensional reconstruction image obtained by processing a plurality of gray-scale images acquired by a transmission electron microscope, or one of the gray-scale images, may be utilized as a reference image of the substance. In this case, the three-dimensional structure verification supporting apparatus may further include a shading unit for generating a three-dimensionally shaded image by shading the three-dimensional reconstruction image. The comparison image generating unit may utilize the three-dimensionally shaded image as the reference image. Moreover, the three-dimensional structure verification supporting apparatus may further include a simultaneous displaying unit for displaying the rotating three-dimensional reconstruction image, or for displaying the three-dimensional comparison image rotationally in accordance with the three-dimensional comparison image or the gray-scale image while displaying the plurality of gray-scale images captured from a plurality of angles sequentially in the order of angles. The reference position data acquiring unit acquires the reference position from a screen display of the parallel displaying unit.

According to a second aspect of the present invention, there is provided a three-dimensional structure verification supporting method for supporting verification of a three dimensional structure by verifying properness of a three-dimensional image indicating the three dimensional structure of a substance. The three-dimensional structure verification supporting method includes steps of: generating a three-dimensional comparison image by adjusting image quality of the three-dimensional image with image quality of a reference image of the substance which is obtained experimentally; and computing degree of image coincidence between the three-dimensional comparison image and the reference image of the substance.

The above-mentioned three-dimensional structure verification supporting method may further include a step of generating the three-dimensional comparison image in accordance with the image quality of the reference image of the substance which is obtained experimentally by adjusting the image quality so that the degree-of-image coincidence between a three-dimensional image of a reference substance, of which the structure is known, and the reference image of the reference substance obtained by experimental structural analysis becomes the greatest.

The three-dimensional image may be a three-dimensional simulated image simulated to indicate a three dimensional structure of a substance. In this case, the three-dimensional structure verification supporting method may further include steps of: generating the plurality of three-dimensional comparison images using the plurality of three-dimensional simulated images indicating a plurality of structures which are to be formed by the substance; computing the degree of image coincidence for each of the plurality of three-dimensional comparison images; and estimating the structure used as a basis of the three-dimensional comparison image, of which the degree of image coincidence is the greatest, to be a structure of the substance. Moreover, the reference image of the substance may be a three-dimensional reconstruction image obtained by processing a plurality of gray-scale images acquired by a transmission electron microscope.

The three-dimensional structure verification supporting method may further include steps of: generating a three-dimensional reconstruction image by processing a plurality of gray-scale images acquired by a transmission electron microscope; generating a three-dimensionally shaded image, which is the three-dimensional image, by shading the three-dimensional reconstruction image; generating the three-dimensional comparison image using the three-dimensionally shaded image; and computing a degree of image coincidence between the three-dimensional comparison image and the gray-scale image, which is a reference image of the substance. In this case, the three-dimensional structure verification supporting method may further include steps of: generating the three-dimensional comparison image by turning the three-dimensional reconstruction image to an angle at which one of the plurality of gray-scale images is captured; and computing the degree of image coincidence between the three-dimensional comparison image and the one of the gray-scale image. Moreover, the three-dimensional structure verification supporting method may further include steps of: computing the plurality of degrees of image coincidence by generating the plurality of three-dimensional comparison images corresponding to the plurality of gray-scale images; statistically processing the plurality of degrees of image coincidence; and adjusting reconstruction condition of the three-dimensional reconstruction image using the processing result.

When the three-dimensional reconstruction image is needed, the three-dimensional structure verification supporting method may further include steps of: simulating shape data indicating an outline of the substance using the plurality of gray-scale images captured by a transmission electron microscope from a plurality of angles; generating a gray-scale density-distribution by extending and distributing density indicated in the plurality of gray-scale images to the angles at which the gray-scale images are captured, respectively; generating three-dimensional gray-scale data by integrating the plurality of gray-scale density-distribution generated from the plurality of gray-scale images captured from the plurality of angles and by indicating the substance by three-dimensional image data; and integrating the three-dimensional gray-scale data and the shape data, and generating the three-dimensional reconstruction image from the three-dimensional gray-scale data by extracting only the gray-scale data which exists in a circumference of an outline indicated by the shape data. Moreover, the three-dimensional structure verification supporting method may further include steps of: simulating shape data indicating the outline of the substance using the plurality of gray-scale images captured by a transmission electron microscope from a plurality of angles; simulating shape data indicating the outline of the substance using the plurality of gray-scale images of the substance captured from a plurality of angles; and generating the three-dimensional reconstruction image by distributing the gray-scale data of the gray-scale image of the substance captured by the transmission electron microscope around the outline.

According to a third aspect of the present invention, there is provided a program for supporting verification of a three dimensional structure by verifying properness of a three-dimensional image indicating a three dimensional structure of a substance. The program includes: a comparison image generating module for generating a three-dimensional comparison image by adjusting image quality of the three-dimensional image with image quality of a reference image of the substance which is obtained experimentally; and a degree-of-image-coincidence computing module for computing a degree of image coincidence between the three-dimensional comparison image and the reference image of the substance acquired by experimental structural analysis.

The program may further include a three-dimensional image supply module for supplying the comparison image generating module with the plurality of three-dimensional images indicating a plurality of structures which are to be formed by the substance. The degree-of-image-coincidence computing module may compute the degree of image coincidence for each of the plurality of three-dimensional comparison images; and the program may further include a selection module for selecting data for specifying the structure of the substance to be used as a basis of the three-dimensional comparison image, of which the degree of image coincidence is the greatest, from a plurality of data specifying the plurality of structures.

This summary of the invention does not necessarily describe all necessary features so that the invention may also be a sub-combination of these described features.

DETAILED DESCRIPTION OF THE INVENTION

The invention will now be described based on the preferred embodiment, which do not intend to limit the scope of the present invention, but exemplify the invention. All of the features and the combinations thereof described in the embodiment are not necessarily essential to the invention.

Figure 1:
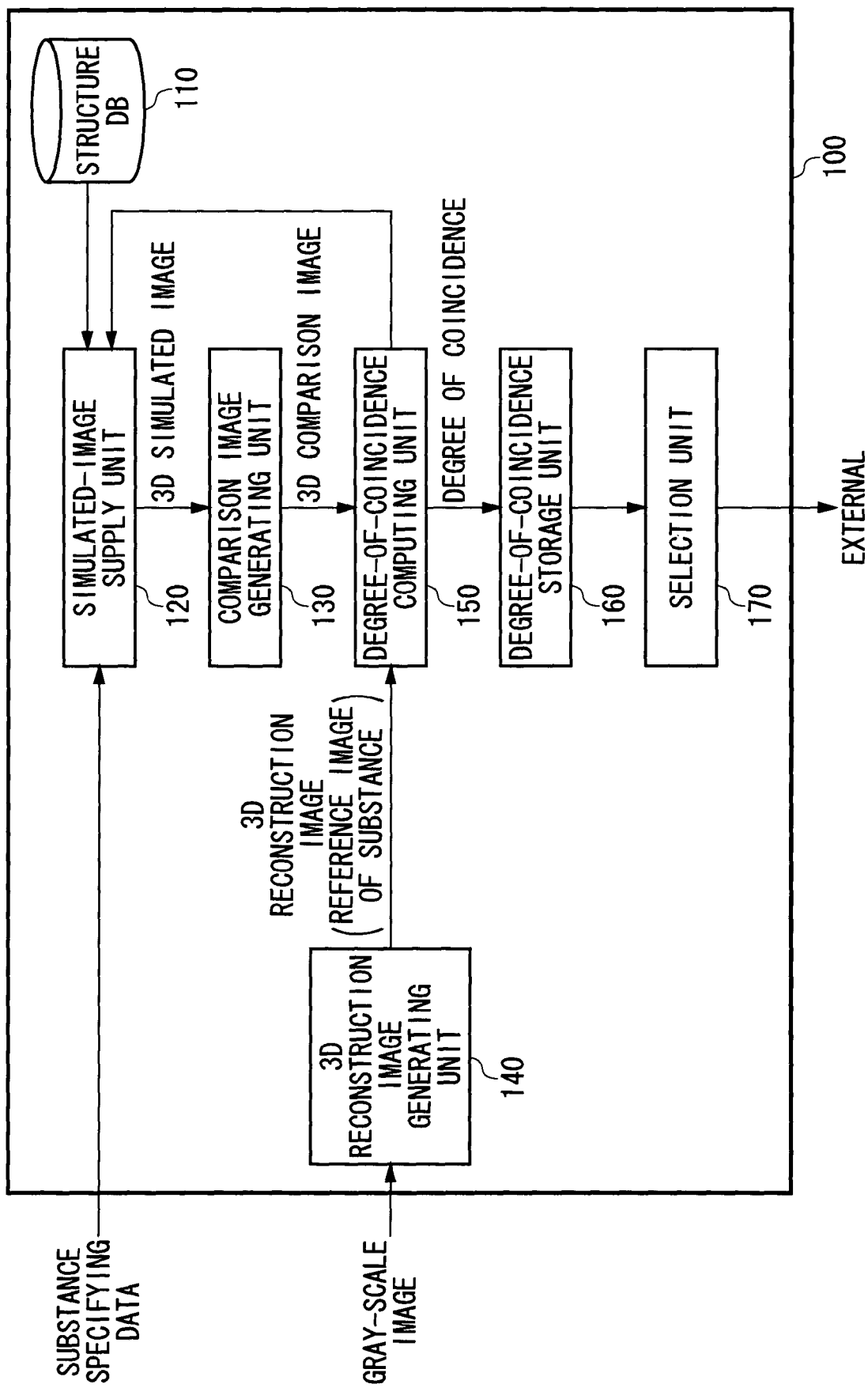
FIG. 1 is a block diagram showing a configuration of a three-dimensional structure verification supporting apparatus 100 according to a first embodiment of the present invention.

FIG. 1 is a block diagram showing a three-dimensional structure verification supporting apparatus 100 according to a first embodiment of the present invention. The three-dimensional structure verification supporting apparatus 100 includes a structure data base 110 as a data base, and includes a simulated-image supply unit 120, a comparison image generating unit 130, a three-dimensional reconstruction image generating unit 140, a degree-of-coincidence computing unit 150, a degree-of-coincidence storage unit 160, a selection unit 170 as functional units.

The three-dimensional structure verification supporting apparatus 100 according to the present embodiment computes a three-dimensional reconstruction image, which is an example of a reference image of a substance, using the three-dimensional reconstruction image generating unit 140 from gray-scale image, which is a projection image acquired by a projection image capturing apparatus such as a transmission electron microscope.

Moreover, the three-dimensional structure verification supporting apparatus 100 generates a plurality of three-dimensional simulated images indicating a plurality of virtual three-dimensional structures of a substance, respectively. Here, a three-dimensionally shaded model image, which is a shaded image of the simulated three dimensional, may be utilized as the three-dimensional simulated image.

Moreover, the three-dimensional structure verification supporting apparatus 100 adjusts image quality of the plurality of three-dimensional simulated images to the image quality of the three-dimensional reconstruction image, so that the plurality of three-dimensional comparison images are generated. Here, the image quality is adjusted by a lookup table of contrast, blurring (modulation of a frequency domain) or the like.

Furthermore, the three-dimensional structure verification supporting apparatus 100 selects a structure of a substance, which is estimated to be the most probable structure, out of a plurality of three-dimensional structures by computing degree of image coincidence between the plurality of three-dimensional comparison images and the three-dimensional reconstruction image, and by selecting the structure which is used as a basis of the three-dimensional comparison image having the highest degree of image coincidence.

That is, the three-dimensional structure verification supporting apparatus 100 is an apparatus for supporting verification of three-dimensional structure of a substance by adjusting the image quality of the three-dimensional simulated image to the image quality of the reference image of the substance acquired by experimental structural analysis, and by facilitating the computation of the degree of image coincidence between the three-dimensional simulated image and the reference image of the substance. However, the experimental structural analysis will be done for the image obtained by various types of analysis apparatuses, not being limited to he image of a transmission electron microscope.

The structure data base 110 stores data for indicating a plurality of structures which can be formed by a substance, e.g., structural models, as three-dimensional images. The substance may consist of single substance, or a plurality of substances. The data stored on the structure data base 110 may be image data of each of the structures, or image data of a plurality of parts which consist of the substance and data for identifying bonding condition between the plurality of parts.

When the data for specifying the kind of substance is received from outside, the simulated-image supply unit 120 generates or acquires the three-dimensional simulated image of the plurality of structures which can be formed by the substance using the data stored in the structure data base 110 corresponding to the substance, and outputs the plurality of three-dimensional simulated images, which are generated or acquired, to the comparison image generating unit 130. Here, although the simulated image supply unit 120 outputs the plurality of three-dimensional simulated images to the comparison image generating unit 130 continuously, it may output the plurality of three dimensional simulated images one-by-one to the comparison image generating unit 130 on receiving an input from the degree-of-coincidence computing unit 150.

The comparison image generating unit 130 generates the three-dimensional comparison image by adjusting the image quality of the three-dimensional simulated image to the image quality of the reference image of the substance acquired by the experimental structural analysis, and outputs the generated three-dimensional comparison image to the degree-of-coincidence computing unit 150. Alternatively, the comparison image generating unit 130 changes the image qualities gradually, and outputs the plurality of three-dimensional comparison images, which are generated using the different image qualities, to the degree-of-coincidence computing unit 150.

Specifically, the comparison image generating unit 130 computes the three-dimensional comparison image using a method called filtering. When using the filtering method, the comparison image generating unit 130 generates the three-dimensional comparison image by computing Fourier transform of the three-dimensional reconstruction image, multiplying the transformed three-dimensional reconstruction image and a filter function which can be defined as a transfer function of an apparatus, such as a transmission electron microscope used when acquiring the three-dimensional reconstruction image, and computing inverse Fourier transform of the multiplied computation result. However, the image quality adjustment method for the comparison image generating unit 130 generating the three-dimensional comparison image is not limited to the embodiment, but the contrast may be adjusted by another means.

The three-dimensional reconstruction image generating unit 140 generates the three-dimensional reconstruction image indicating a three dimensional structure of a subject using a plurality of projection image data captured from a plurality of angles by a transmission electron microscope, etc., i.e., gray-scale images, and outputs the generated three-dimensional reconstruction image to the degree-of-coincidence computing unit 150.

The degree-of-coincidence computing unit 150 computes the degree of image coincidence between the three-dimensional comparison image acquired from the comparison image generating unit 130 and the three-dimensional reconstruction image acquired from the three-dimensional reconstruction image generating unit 140, and outputs the computed degree of image coincidence to the degree-of-coincidence storage unit 160. Moreover, whenever the degree-of-coincidence computing 150 outputs the degree of image coincidence, it informs the simulated image supply unit 120 that the degree of image coincidence has been output.

As for the degree-of-coincidence calculation method made by the degree-of-coincidence computing unit 150, a cross-correlation function is computed as the degree of image coincidence by a cross-correlation method, for example. However, the degree-of-coincidence calculation method made by the degree-of-coincidence computing unit 150 is not limited to the embodiment.

The degree-of-coincidence storage unit 160 relates the degree of image coincidence acquired from the degree-of-coincidence computing unit 150 with a kind of the three-dimensional reconstruction image and stores them. Here, when there are a plurality of degrees of image coincidence related to one three-dimensional simulated image due to difference of angles of the images or the difference of directions, the degree-of-coincidence storage unit 160 relates the plurality of degrees of image coincidence with the three-dimensional simulated image and stores them.

The selection unit 170 selects the greatest degree of image coincidence as the degree of image coincidence of the three-dimensional simulated image, among the plurality of degrees of image coincidence stored in the degree-of-coincidence storage unit 160 related to the three-dimensional simulated image.

Moreover, when the degrees of image coincidence about all of the three-dimensional simulated images has been computed, the selection unit 170 compares these degrees of image coincidence stored in the degree-of-coincidence storage unit 160, and selects the three-dimensional simulated image, of which the degree of image coincidence is judged to be the greatest. Then, the selection unit 170 selects and acquires the data specifying the structure relating to the three-dimensional simulated image from the structure data base 110, and outputs the acquired data to the external of the three-dimensional structure verification supporting apparatus 100. That is, the selection unit 170 selects the structure of the substance used as the basis of the three-dimensional comparison image, of which the degree of image coincidence is judged to be the greatest, from a plurality of structures which can be formed by the substance.

Here, when there are a plurality of degrees of image coincidence related to one three-dimensional simulated image due to difference of angles of the images, i.e., the difference of directions, the selection unit 170 processes the degrees of image coincidence statistically, and determines the level relation between the degrees of image coincidence using the result. The selection unit 170 computes an arithmetic average, a weighted average, etc. as a statistical procedure.

Figure 2:
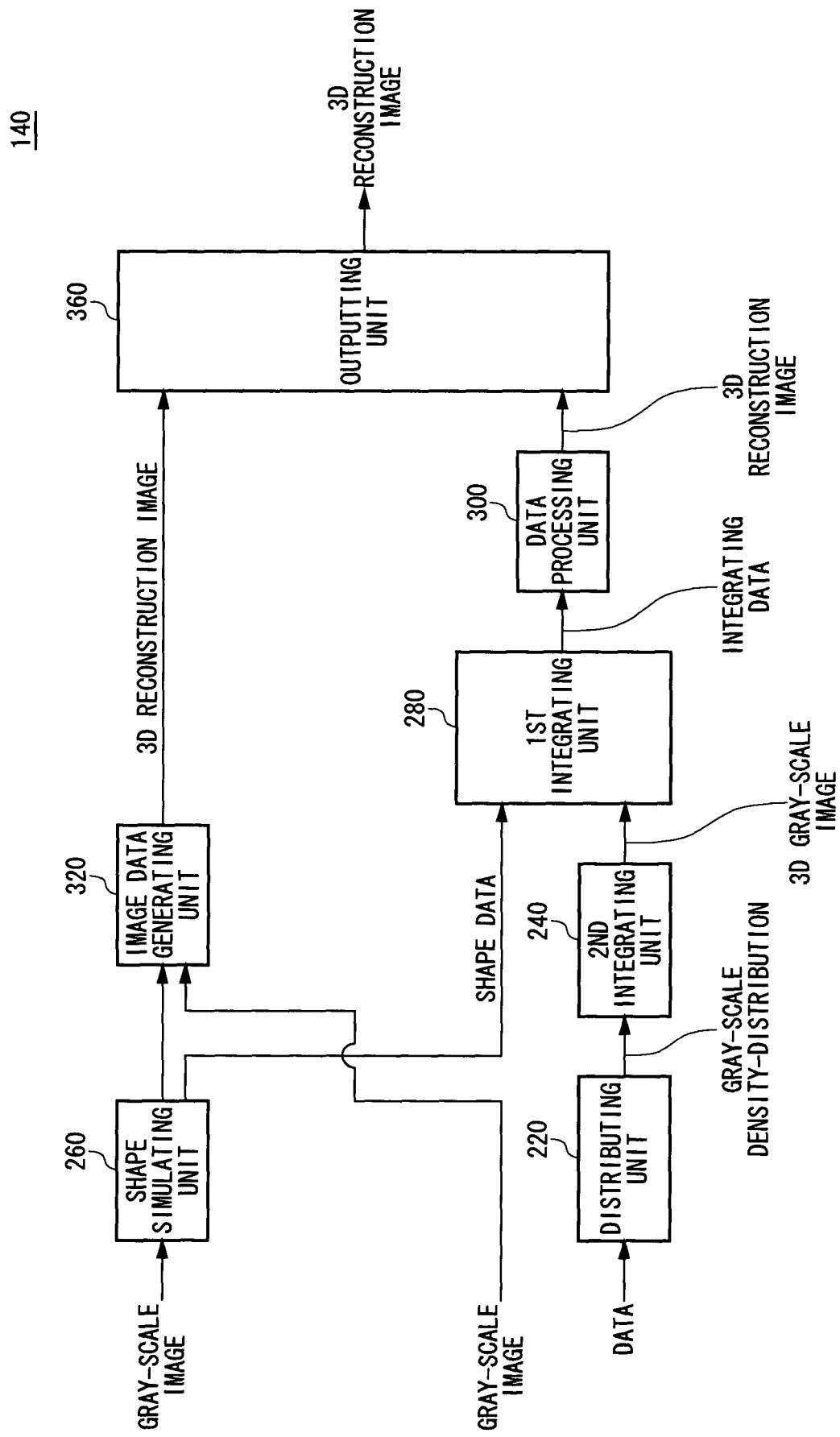
FIG. 2 is a block diagram showing a configuration of a three-dimensional reconstruction image generating unit 140.

FIG. 2 is a block diagram exemplary showing a configuration of the three-dimensional reconstruction image generating unit 140. In the embodiment, the three-dimensional reconstruction image generating unit 140 includes a distributing unit 220, a second integrating unit 240, a shape computing unit 260, a first integrating unit 280, a data processing unit 300, an image data generating unit 320, and an outputting unit 360.

The distributing unit 220 generates gray-scale density-distribution by extending and distributing the plurality of gray-scale images acquired from exterior to a captured angle, i.e., a projected angle respectively, and outputs it to the second integrating unit 240. For example, the distributing unit 220 distributes gray-scale of the gray-scale image uniformly in the extending direction.

The second integrating unit 240 generates three-dimensional gray-scale data by integrating the plurality of gray-scale density-distribution generated by the distributing unit 220, with their angle being maintained, and outputs it to the first integrating unit 280. The generated three-dimensional gray-scale data becomes data indicating the subject with three-dimensional image data. Here, there is some possibility that false information is included in the three-dimensional gray-scale data.

The shape computing unit 260 computes height information on specific points of the subject, that is, processing objective points, from three or more image data captured from three or more angles, and computes shape data which represents outline of the subject using the height information on a plurality of the processing objective points.

Figure 3:
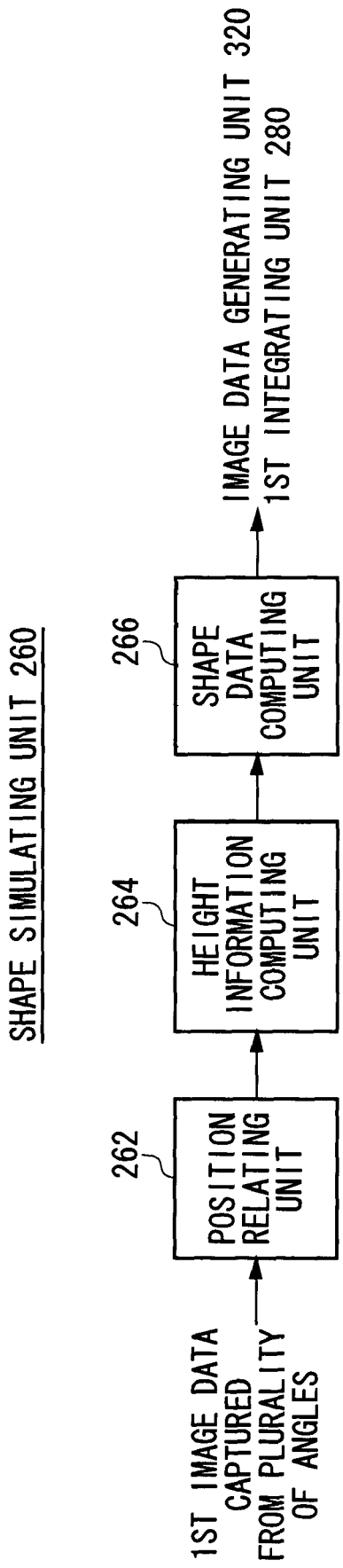
FIG. 3 is a block diagram showing a configuration of a shape computing unit 260.

FIG. 3 shows an example of a configuration of the shape computing unit 260. The shape computing unit 260 includes a position relating unit 262, a height data computing unit 264, and a shape data computing unit 266.

The position relating unit 262 recognizes positions of a plurality of processing objective points in two set of the image data which is consecutive in the order of an angle, relates them respectively, and outputs them to the height data computing unit 264.

In detail, relating positions of the processing objective points in first image data and second image data, which are consecutive in order of angles are related, and relating positions of the processing objective points in the second image data and the third image data just next to the second in order of angles are related. This relating process is performed sequentially also to the other image combinations such as the third and fourth image data, and so on. Each of the processing objective points is related in two or more sets of image combination, respectively.

Moreover, the position relating unit 262 defines a base line in the image data, and measures distances of the base line and the processing objective points. When a difference of the distances from the base line to the processing objective points in two images, which constitute an image combination, is more than a predetermined level, the position relating unit performs again the position recognitions and the relations to the processing base line.

Here, the position relating unit relates the positions of processing objective points using the above mentioned predetermined angle when each of the images are captured with a rotation of the subject by the predetermined angle with the same rotation axis as the rotation center, or the first and second images among three or more image data, are captured with a rotation of the subject by a predetermined angle with a rotating axis as a rotating center, and the third image are captured with a rotation of the subject with another rotating axis as a rotating center, by the predetermined angle, from the position where the first image was captured.

A height data computing unit 264 calculates height information of the processing objective points related by the position relating unit 262 in two set of image data respectively, and outputs them to the shape data computing unit 266. The processing performed by the height data computing unit 264 is same as the so-called processing of a stereoscopic vision method. Here, since each of the processing objective points is related in at least two or more sets of image combination respectively, the height data computing unit 264 calculates two or more height information of each of the processing objective points. The height data computing unit 264 calculates height information which should be outputted by the least-squares error method based on a plurality of height information. When the error by the least-squares error method is more than a predetermined value, the position relating unit 262 re-detects the positions of processing objective points.

A shape data computing unit 266 calculates shape data of the subject using height information of the processing objective points which the height data computing unit 264 calculated, and plane information of the processing objective points calculated from the image data. The shape data computing unit 266 outputs the calculated shape data to the image data generating unit 320 and the first integrating unit 280.

Returning to FIG. 2, the first integrating unit 280 generates an integrated image by integrating shape data generated by the shape computing unit 260 and three-dimensional gray-scale data generated by the second integrating unit 240, and outputs the image to the data processing unit 300.

The data processing unit 300 generates three-dimensional reconstruction image data by extracting only information which exists around the shape data or information which laps with the shape data, from three-dimensional gray-scale density-distribution, using the integrated image which the first integrating unit 280 outputted, and outputs the three-dimensional reconstruction image data to the outputting unit 360. When the false information is included in the three-dimensional gray-scale data, there is no lapping between the false information and the shape data. Therefore, false information is not included in the information that the data processing unit 300 extracts. Consequently, the three-dimensional reconstruction image data corresponds to information representing a three-dimensional structure of the subject with more accuracy.

The image data generating unit 320 generates three-dimensional reconstruction image data of the subject by distributing the gray-scale image acquired from the external, around the corresponding part of the outline which is shown by the shape data computed by the shape computing unit 260, and outputs the generated three-dimensional reconstruction image data to the outputting unit 360. For example, an image data generating unit 320 generates the three-dimensional gray-scale image by distributing densities of the gray-scale image evenly only over the area which is in a predetermined range from the part of the outline.

Here, false information does not arise because the image data generating unit 320 generates three-dimensional reconstruction image data of the subject, without going through processes of spreading and integrating the gray-scale image, within the captured angle.

The outputting unit 360 outputs the shape data generated by the shape computing unit 260, the three-dimensional reconstruction image data generated by the image data generating unit 320, and the three-dimensional reconstruction image data generated by the data processing unit 300 to the degree-of-coincidence computing unit 150.

Figure 4:
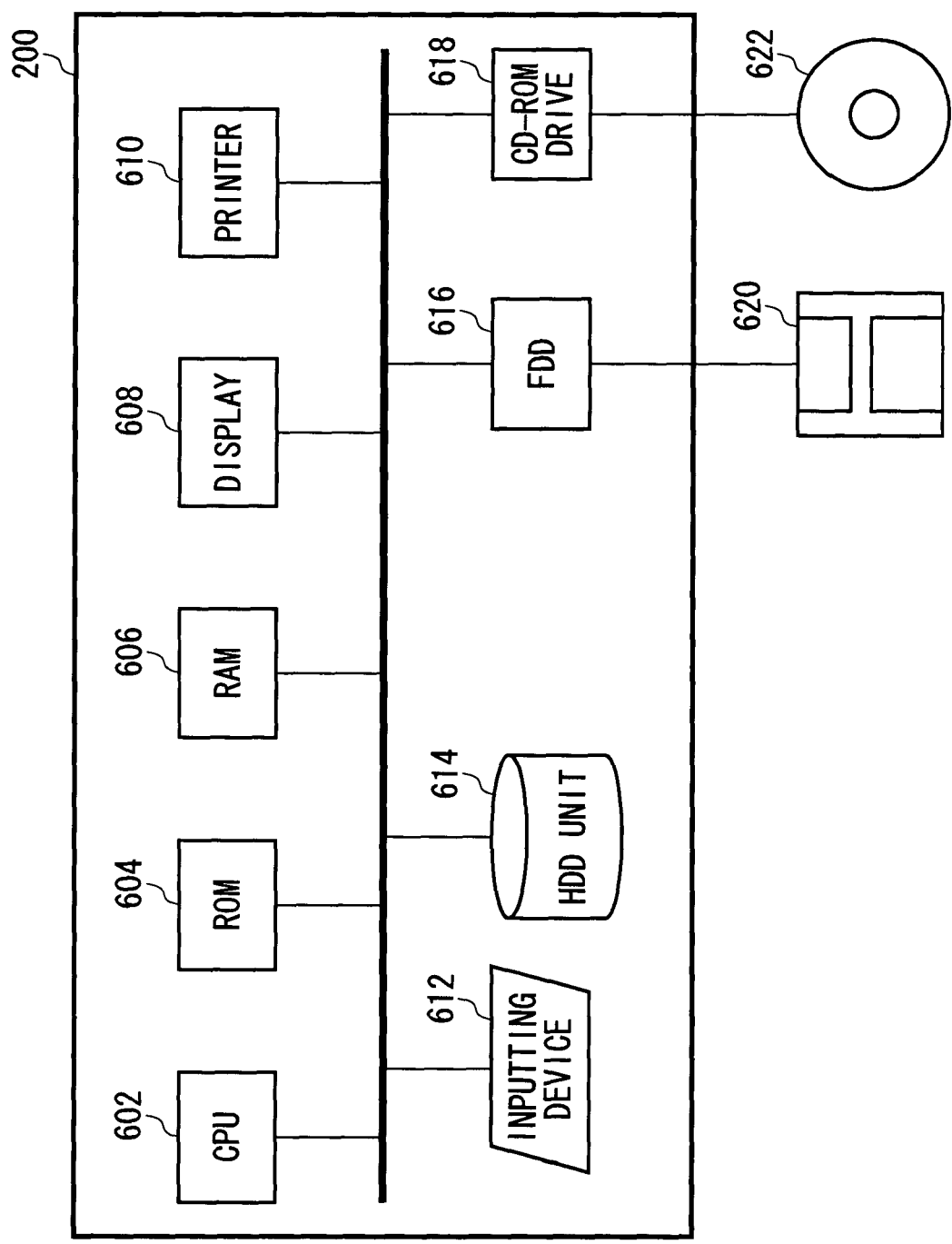
FIG. 4 is a block diagram exemplary showing a hardware configuration of the three-dimensional reconstruction image generating unit 140.

FIG. 4 is a block diagram exemplary showing a hardware configuration of the three-dimensional reconstruction image generating unit 140. In the present embodiment, the three-dimensional reconstruction image generating unit 140 includes CPU (central processing unit) 602, ROM (read only memory) 604, RAM (random access memory) 606, a display 608, a printer 610, an inputting device 612, a hard disk drive unit 614, FD (or floppy diskette) drive 616, and CD-ROM (compact disk ROM) drive 618.

The CPU 602 executes processing based on a program stored on the RAM 606 and the ROM 604. The display 608 displays various data. The printer 610 prints out various data. The inputting device 612 inputs setting etc., to the three-dimensional reconstruction image generating unit 140. The FD drive 616 reads data or a program on a floppy disk 620, and transfers it to the CPU 602. The CD-ROM drive 618 reads data or a program on CD-ROM 622, and transfers it to the CPU 602. The hard disk 614 stores the data or the program read by the FD drive 616 or the CD-ROM drive 618 and also stores the data composed by the CPU 602 by executing the program, reads the stored data and the program, and transfers it to the CPU 602.

In the embodiment, functional units of the above-mentioned three dimensional reconstruction image generating unit 140 are realized by reading the program from the CD-ROM 622, in which the program for realizing each of the functional units of the above-mentioned three dimensional reconstruction image generating unit 140 is stored, installing the program onto the hard disk 618, and by the CPU 602 reading the program from the hard disk 618 and executing it.

More specifically, the above-mentioned program includes: a simulated-image supply module for realizing the simulated-image supply unit 120; a comparison image generating module for realizing the comparison image generating unit 130; a degree-of-coincidence computing module for realizing the degree-of-coincidence computing unit 150; a degree-of-coincidence storage module for realizing the degree-of-coincidence storage unit 160; a selection module for realizing the selection unit 170; a distributing module for realizing the distributing unit 220; a second integrating module for realizing the second integrating unit 240; a shape computing module for realizing the shape computing unit 260; a first integrating module for realizing the first integrating unit 280; a data processing module for realizing the data processing unit 300; an image data generating module for realizing an image data generating unit 320; and an outputting module for realizing the outputting unit 360.

Since the operation of the modules is the same as that of the corresponding functional units, the explanation will be omitted. Alternatively, the above-mentioned program is not stored in the CD-ROM 622 but in the floppy disk 620 or another recording medium, such as MO or MD.

Next, a first operational example of the three-dimensional reconstruction image generating unit 140 will be explained in relation to FIG. 5 to FIG. 12. In the example, two hemispherical subjects 400 arranged parallel and upward are captured by a projection image capturing apparatus, and the three-dimensional reconstruction image is generated using the three-dimensional reconstruction image generating unit 140.

Figure 5:
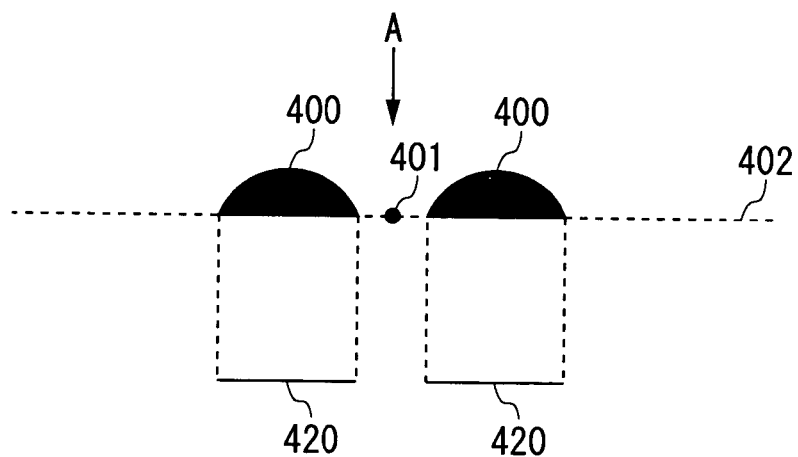
FIG. 5 is a drawing explaining how to acquire gray-scale image.
Figure 6:
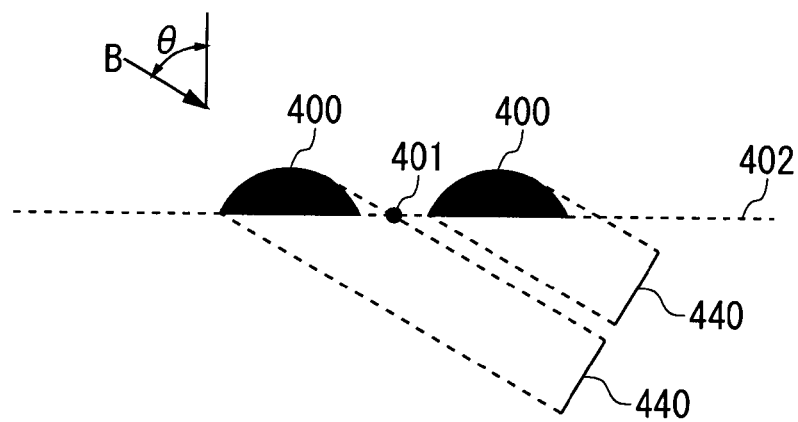
FIG. 6 is a drawing explaining how to acquire the gray-scale image.
Figure 7:
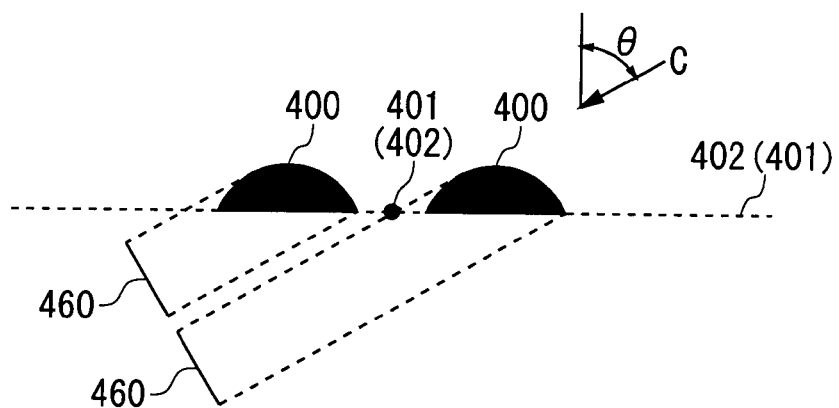
FIG. 7 is a drawing explaining how to acquire the gray-scale image.

First, a step of acquiring the gray-scale image will be explained. As shown in FIG. 5, FIG. 6 and FIG. 7, the subjects are captured from at least three different angles (direction A, direction B, and direction C in the example), and the gray-scale images, i.e., projection image data 420, 440, and 460 are acquired. Here, as shown in FIGS. 5 and 6, it is preferable to make an angle between the direction A and the direction B and an angle between the direction B and the direction C be θ.

Alternatively, the direction B and the direction C are angles rotated from the direction of the direction A on a same axis 401, or angles rotated from the direction of the direction A on different axes 401 and 402, respectively.

Then, the gray-scale images 420, 440, and 460 are input into the three-dimensional reconstruction image generating unit 140. Here, the gray-scale images 420, 440, and 460 serve also as the first image data.

In the embodiment, the distributing unit 220 of the three-dimensional reconstruction image generating unit 140 extends each of the gray-scale images 420, 440, and 460 in the direction of the image capturing, generates the gray-scale density-distribution 425, 445, and 465, and the second integrating unit integrates the gray-scale density-distribution 425, 445, and 465, with the angle being maintained, and generates the three-dimensional gray-scale data.

Figure 8:
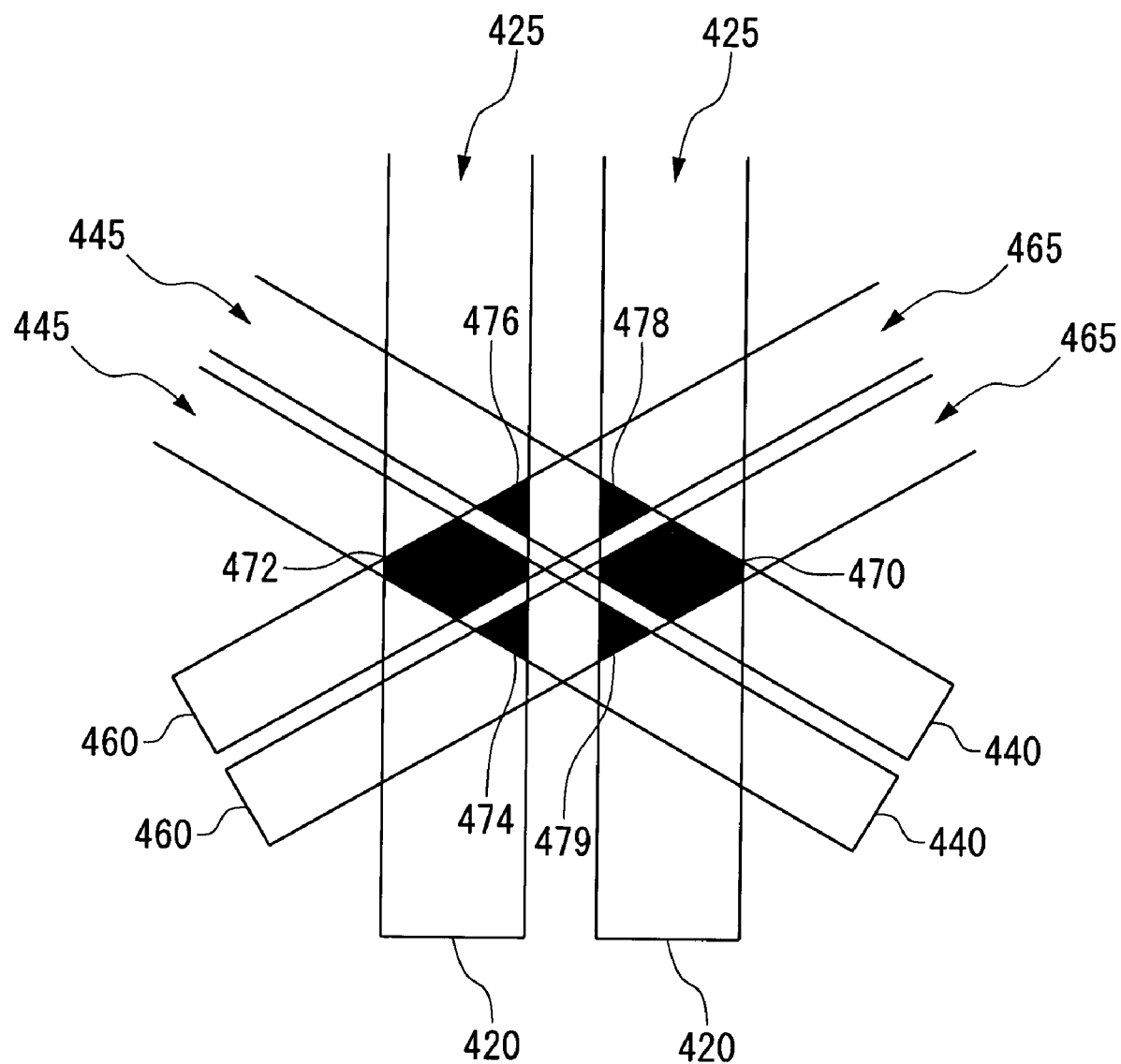
FIG. 8 is a drawing showing longitudinal section data, which is an example of three-dimensional gray-scale data.

FIG. 8 is a drawing exemplary showing longitudinal section data of the three-dimensional gray-scale data in the example. The three-dimensional gray-scale data indicates that an object exists at a portion where all of the gray-scale density-distribution are integrated. FIG. 7 shows that the subjects 400 exists at the portion where all of the gray-scale density-distribution 425, 445, and 465 are integrated, i.e., data 470, 472, 474, 476, and 478. However, the number of the subjects 400 is two and three of the five data are the false information.

Figure 9:
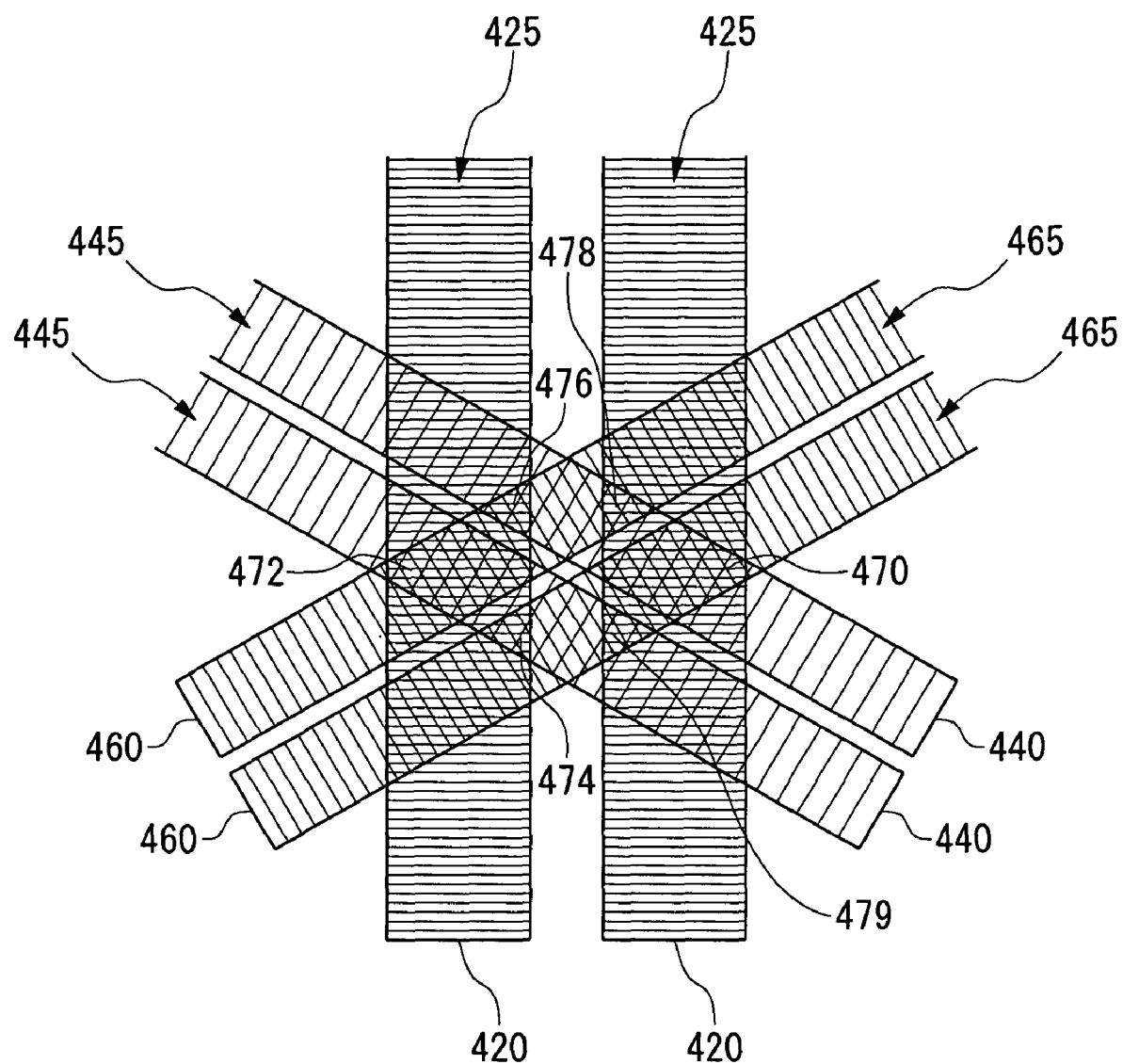
FIG. 9 is a drawing showing another example of the longitudinal section data of the three-dimensional gray-scale data.

FIG. 9 shows another example of the longitudinal section data of the three-dimensional gray-scale data in the example. In the example, the densities of the gray-scale images 420, 440, and 460 are different from one another. Moreover, the gray-scale density-distribution 425, 445, and 465 are data being extended at the angle at which the gray-scale of the gray-scale images 420, 440, and 460 are captured and distributed uniformly. In this case, since portions other than the data 470 to 478 may also have the same or higher density as/than that of one of the data 470 to 478, the number of false information may increase further.

Moreover, the shape computing unit 260 of the three-dimensional reconstruction image generating unit 140 computes the shape data 265 indicating the outline of the subjects 400 from the gray-scale images 420, 440, and 460. Here, the shape computing unit 260 cannot compute the whole outline of the subjects 400, and only a portion commonly included in visual fields of the direction A, the direction B, and the direction C in the drawing is computed. In the example, an outline is computed only for a spherical portion of the subjects 400.

Then, the first integrating unit 280 of the three-dimensional reconstruction image generating unit 140 integrates the shape data by the shape computing unit 260 and the three-dimensional gray-scale image.

Figure 10:
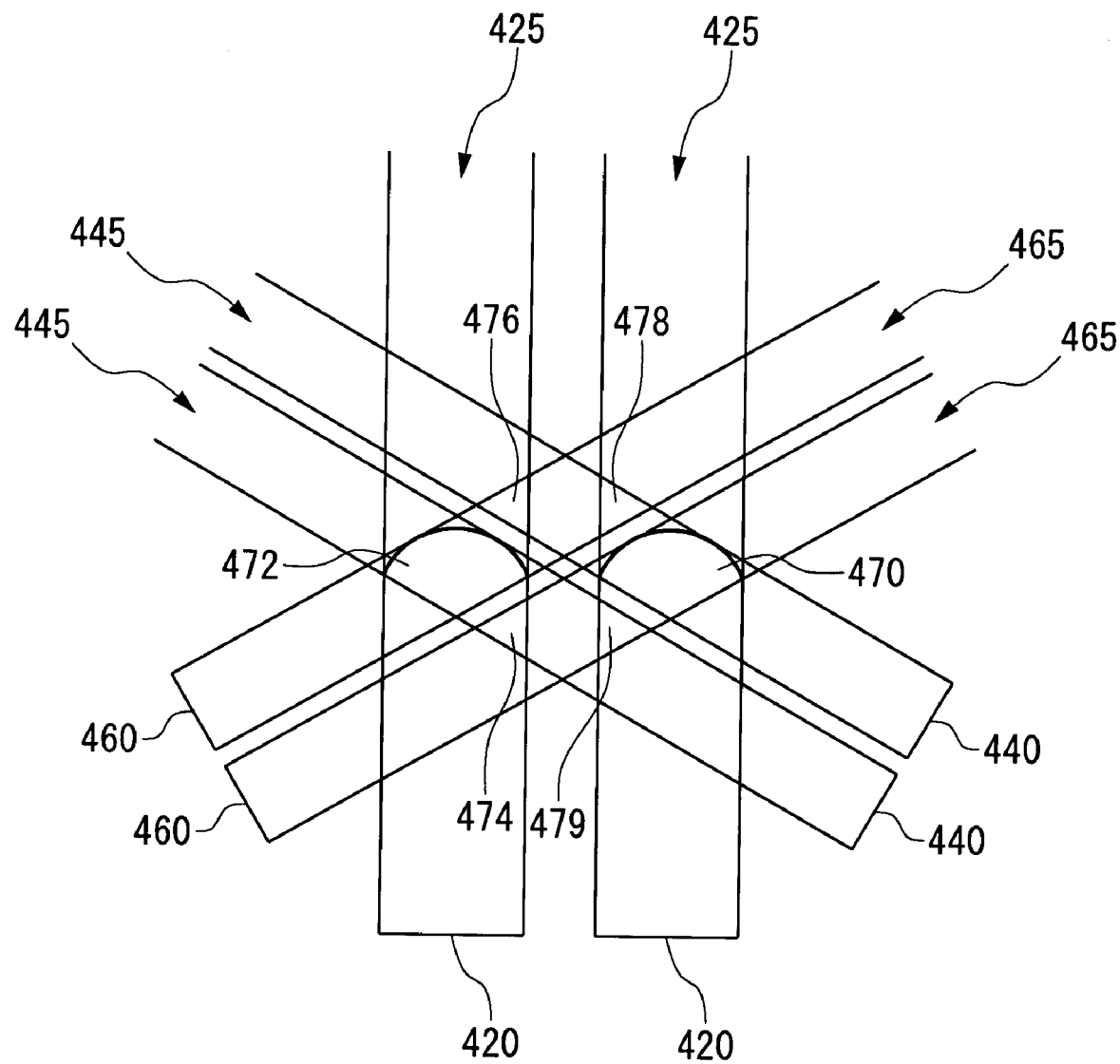
FIG. 10 is a drawing showing longitudinal section data of an example of an integrated image by a first integrating unit 280.

FIG. 10 is a drawing showing the longitudinal section data of the integration image by the first integrating unit 280 in the embodiment. In the embodiment, two shape data 265 by the shape computing unit 260 are integrated on data 470 and 472, respectively. Therefore, the data processing unit 300 determines that the data 470 and 472 are the true data indicating the object, and data 474, 476 and 478 are the false information, extracts only the data 470 and 472, and outputs them to the outputting unit 360 as the three-dimensional reconstruction image.

Consequently, the false information is excluded from the three-dimensional reconstruction image.

Here, when reliability of the shape data 265 is high, the data processing unit 300 outputs the three-dimensional reconstruction image considering the shape data 265. Moreover, when the focus of the gray-scale density-distribution 425, 445, and 465 is not clear or the like, a boundary of the data 470 and a boundary of the data 472 do not become clear. In this case, the data processing unit 300 lets data, which exists within a predetermined distance from the shape data 265, be the data 470 and 472.

Alternatively, a person substitutes the operation of the data processing unit 300 by displaying the integration data by the first integrating unit 280 on a display etc., and the false information is removed by adding a judgment of a person on the three-dimensional reconstruction image by the data processing unit 300. In this case, the false information is removed more in line with circumstances.

Figure 11:
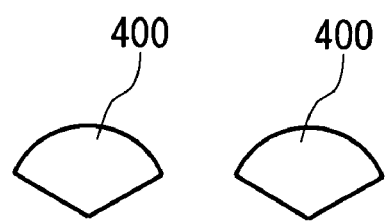
FIG. 11 is a longitudinal section exemplary showing three-dimensional image data by a data processing unit 300.

FIG. 11 is a drawing showing a longitudinal section of the three-dimensional reconstruction image by the data processing unit 300 in the present embodiment. It is seen that the three-dimensional reconstruction image by the data processing unit 300 reproduces the subjects 400 accurately.

Then, according to need, the outputting unit 360 outputs the shape data 265 computed by the shape computing unit 260 and the three-dimensional reconstruction image generated by the data processing unit 300, i.e., the data 470 and the data 472, to the displaying apparatus or the printer.

That is, in the first operational example, the three-dimensional reconstruction image generating unit 140 acquires a more accurate three-dimensional reconstruction image using the distributing unit 220, the second integrating unit 240, the shape computing unit 260, the first integrating unit 280, and the data processing unit 300.

Next, a second operational example of the three-dimensional reconstruction image generating unit 140 will be explained using FIGS. 12 and 13. In the example, the three-dimensional reconstruction image generating unit 140 acquires the three-dimensional reconstruction image of the subjects 400 using the gray-scale images 420, 440, and 460 like the first operational example.

Figure 12:
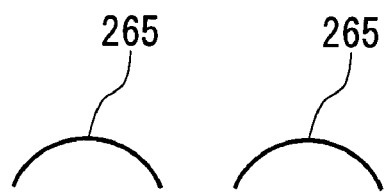
FIG. 12 is a drawing explaining a second operational example of the three-dimensional reconstruction image generating unit 140.

First, as shown in FIG. 12, the shape computing unit 260 computes the shape data 265.

Figure 13:
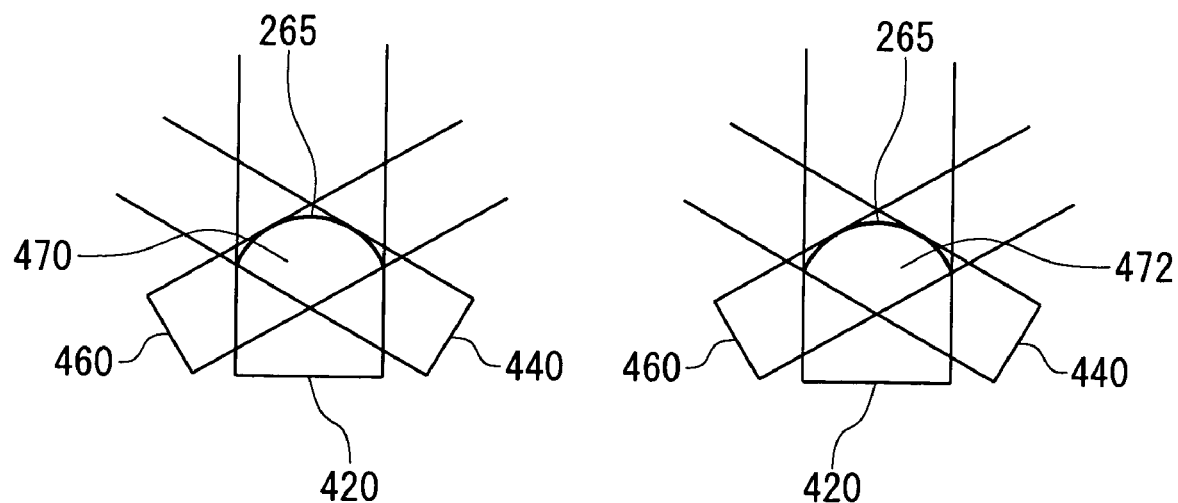
FIG. 13 is another drawing explaining the second operational example of the three-dimensional reconstruction image generating unit 140.

Then, as shown in FIG. 13, the image data generating unit 320 distributes the gray-scale images 420, 440, and 460 only over the circumference of the shape data 265, and lets a portion, where all of three gray-scale image are integrated, i.e., the data 470 and 472, be the three-dimensional reconstruction image. Consequently, the false information is excluded from the three-dimensional reconstruction image.

Here, when the reliability of the shape data 265 is high, the image data generating unit 320 outputs the three-dimensional reconstruction image considering the shape data 265. Moreover, when the boundary of the data 470 and the boundary of the data 472 are not clear, the image data generating unit 320 lets the data, which exists within a predetermined distance from the shape data 265, be the data 470 and 472. Here, when the reliability of the shape data 265 is high, the image data generating unit 320 outputs the three-dimensional reconstruction image considering the shape data 265. Moreover, when the focus of the gray-scale density-distribution 425, 445, and 465 is not clear, the boundary of the data 470 and the boundary of the data 472 are not clear. In this case, the image data generating unit 320 lets the data, which exists within a predetermined distance from the shape data 265, be the data 470 and 472. For example, when a thickness of the subjects 400 is known as D, density data of the gray-scale images 420, 440, and 460 are uniformly distributed within limits of the thickness D from the outline. At this time, it is also preferable that the above-mentioned gray-scale data are distributed in the projection direction within the limits of the thickness D.

That is, in the second operational example, the three-dimensional reconstruction image generating unit 140 acquires a more accurate three-dimensional reconstruction image using the shape computing unit 260 and the image data generating unit 320.

The three-dimensional reconstruction image generating unit 140 exhibits the above-mentioned effect in particular when the capturable angle is limited.

For example, even if the projection image data is the image data acquired from the transmission electron microscope, where the capturable angle is limited, it becomes possible to clarify the three-dimensional structure of the subject on a molecule scale by the three-dimensional reconstruction image generating unit 140.

As a detailed example, there is a case where it is desired to clarify structure of protein of a cell and its change. In this case, by capturing a type of the protein acquired by a so-called quick-frozen, deep-etch and replica method by the transmission electron microscope and processing it in the three-dimensional reconstruction image generating unit 140, the three-dimensional data indicating the three-dimensional structure of the protein as the subject, where the false information, i.e., so-called ghost, is removed, is acquirable.

Figure 14:
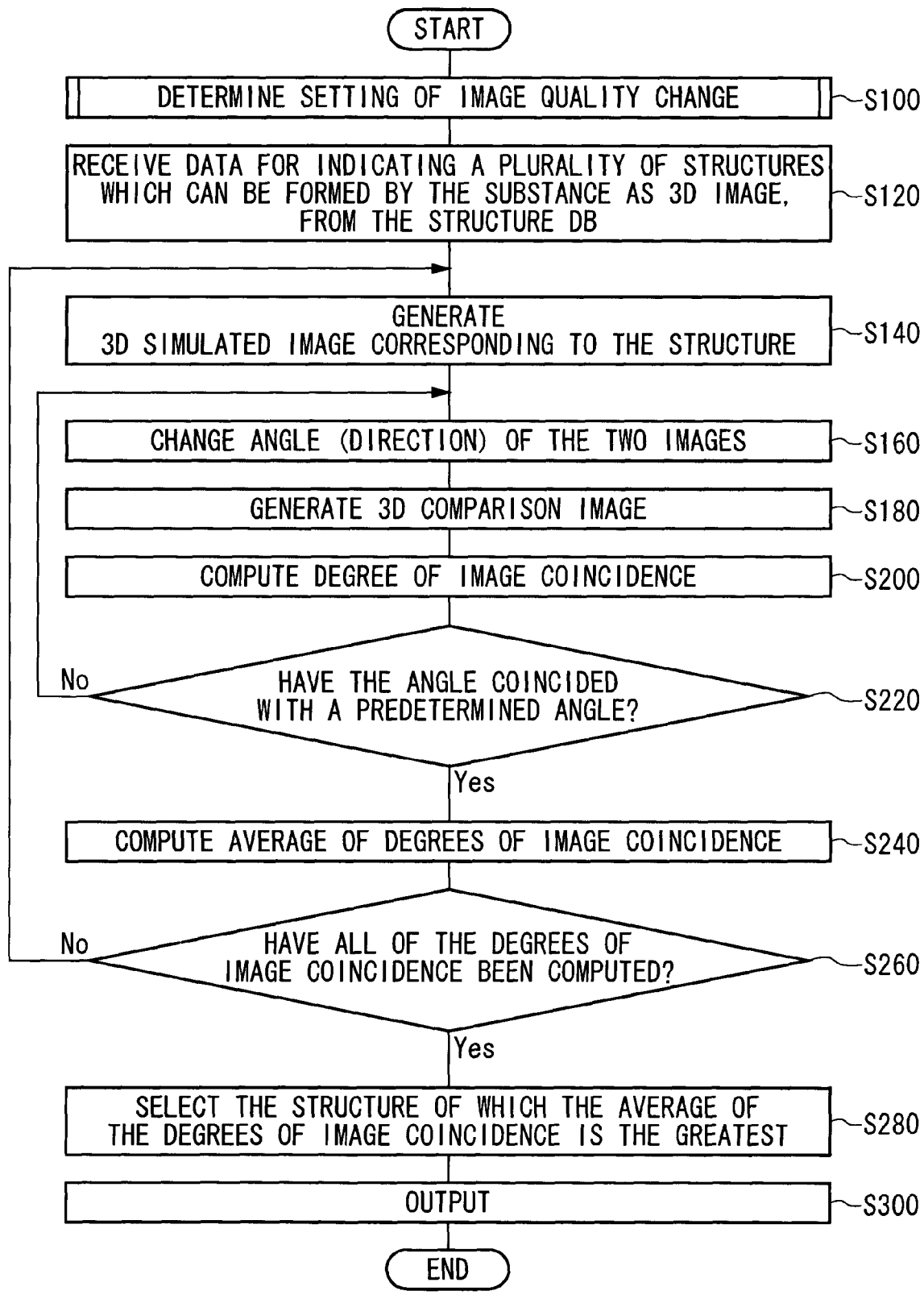
FIG. 14 is a flow chart exemplary showing operation of the three-dimensional structure verification supporting apparatus 100.

FIG. 14 is a flowchart exemplary showing an operation of the three-dimensional structure verification supporting apparatus 100. In the present embodiment, the three-dimensional reconstruction image generating unit 140 generates a three-dimensional reconstruction image in advance. First, the simulated-image supply unit 120 determines a setting of image quality change (S100). Then, on receiving data for specifying a substance from the external, it receives the data for indicating a plurality of structures which can be formed by the substance as a three-dimensional image, from the structure data base 110 (S120).

Next, the simulated-image supply unit 120 selects one of the structures, and generates the three-dimensional simulated image corresponding to the structure (S140).

Then, the comparison image generating unit 130 changes angle of the three-dimensional simulated image, i.e., direction of the three-dimensional simulated image, and the degree-of-coincidence computing unit 150 changes angle of the three-dimensional reconstruction image in accordance with the three-dimensional simulated image (S160). Then, the comparison image generating unit 130 changes the image quality of the generated three-dimensional simulated image according to the setting in S100, and generates the three-dimensional comparison image (S180). Then, the degree-of-coincidence computing unit 150 computes the degree of image coincidence between the three-dimensional reconstruction image and the three-dimensional comparison image, and stores it in the degree-of-coincidence storage unit 160 (S200).

The comparison image generating unit 130 and the degree-of-coincidence computing unit 150 repeat the steps from S160 to S200 until the angle of the three-dimensional simulated image coincides with a predetermined angle (S220).

Then, the degree-of-coincidence computing unit 150 computes the average of the plurality of degrees of image coincidence at the plurality of angles computed by repeating the steps from S160 to S200 (S240).

The comparison image generating unit 130 and the degree-of-coincidence computing unit 150 perform the above-mentioned steps from S140 to S240 for all structure data acquired in S120 (S260).

Then, the selection unit 170 selects the three-dimensional simulated image, of which the average of the degrees of image coincidence is the greatest (S280), estimates the structure of the substance indicated by the selected three-dimensional simulated image to be the structure of the substance, selects the data specifying the structure from the structure data base 110, and outputs them (S300).

Therefore, by using the three-dimensional structure verification supporting apparatus 100, the credibility of the model indicating the structure of the substance is verified quantitatively, and the structural model estimated to be the most appropriate can be determined.

Figure 15:
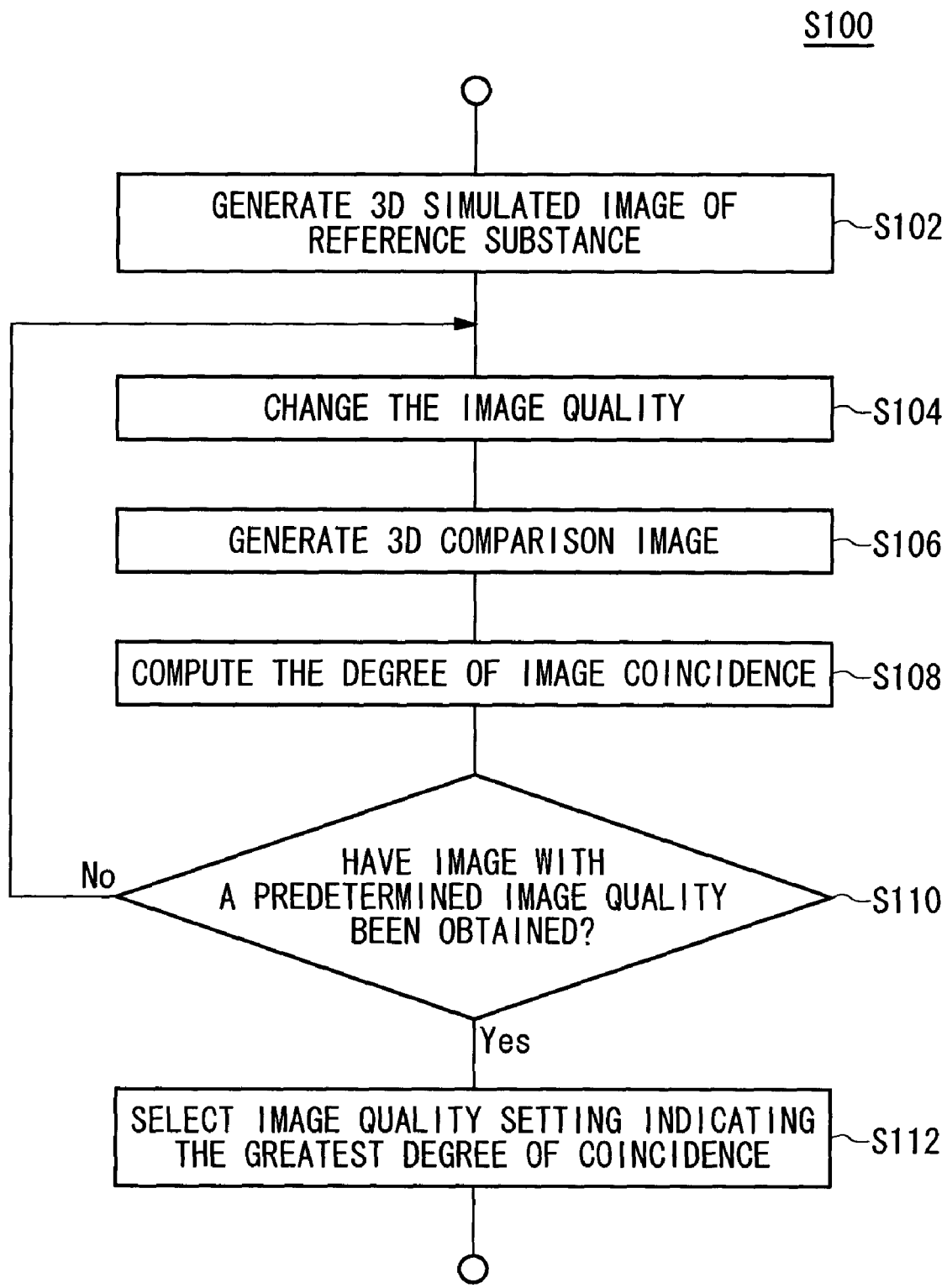
FIG. 15 is a flow chart showing a detailed operation of S100 depicted in FIG. 14.

FIG. 15 is a flow chart showing a detailed operation of S100 depicted in FIG. 14. In the example, the simulated-image supply unit 120 generates the three-dimensional simulated image of a reference substance, of which the structure is known, using the structure data stored in the structure data base 110 (S102). Then, the comparison image generating unit 130 changes the setting of the image quality (S104), and generates the three-dimensional comparison image, of which the quality of the image is similar to the image quality which is set up using the generated three-dimensional simulated image (S106). In S104, the comparison image generating unit 130 changes the setting of the image quality by changing a transfer function by the filtering method, for example.

Then, the degree-of-coincidence computing unit 150 computes the degree of image coincidence between the three-dimensional reconstruction image and the three-dimensional comparison image, and stores it in the degree-of-coincidence storage unit 160 (S108). The steps from S140 to S180 will be repeated until the image with a predetermined image quality is obtained (S110). After that, the greatest degree of image coincidence is selected among the plurality of degrees of image coincidence computed corresponding to the plurality of image qualities, and the setting of the image quality change is selected at the selected degree of image coincidence (S112).

Therefore, according to the three-dimensional structure verification supporting apparatus 100, since the setting of the image quality change is used for all of the structures, the conditions become the same as one another among all of the structures. Moreover, since the setting of the image quality change is determined using the reference substance, the image quality change can be set more appropriately.

Figure 16:
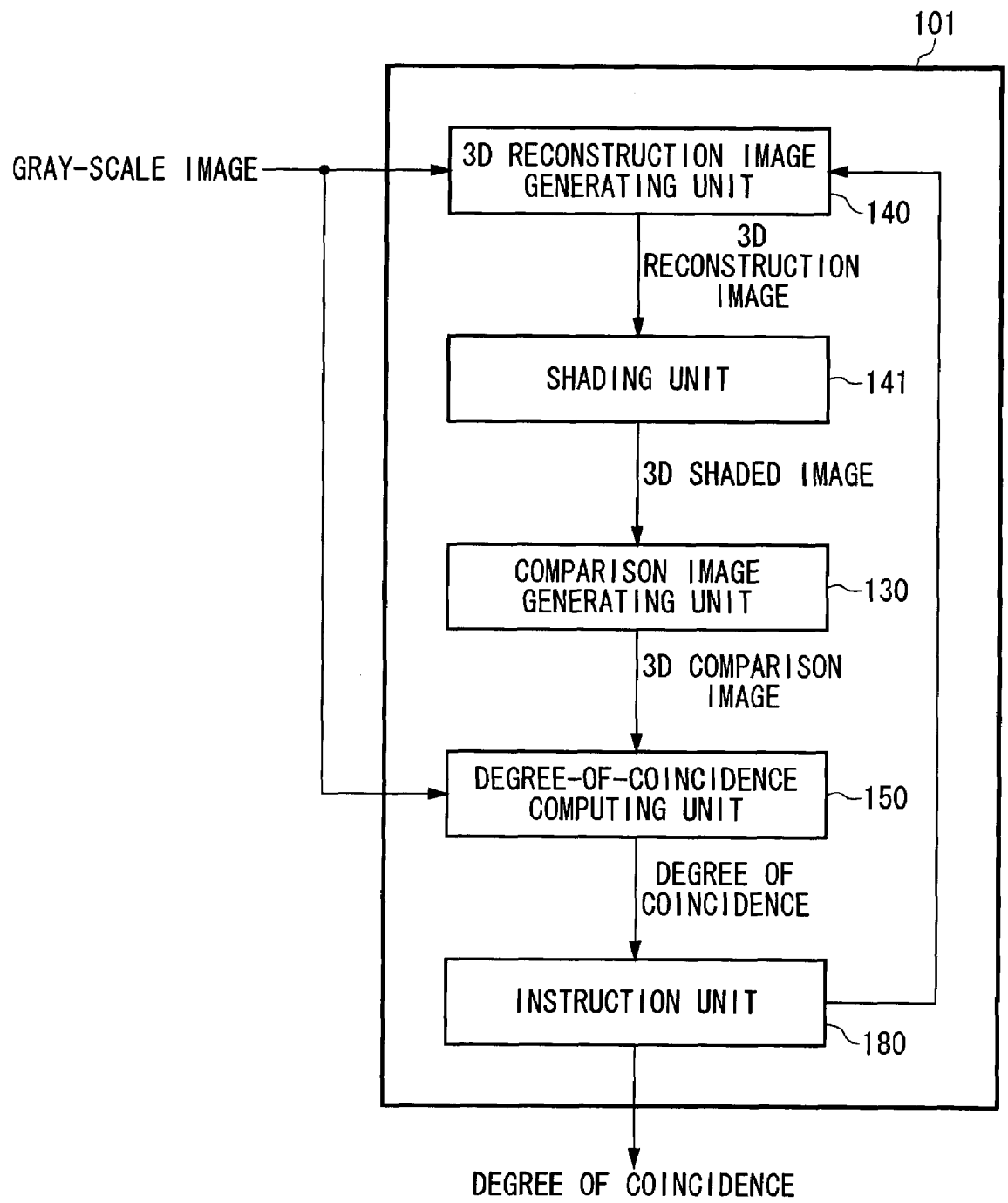
FIG. 16 is a block diagram showing a configuration of a three-dimensional structure verification supporting apparatus 101 according to a second embodiment of the present invention.

FIG. 16 is a block diagram showing a configuration of a three-dimensional structure verification supporting apparatus 101 according to a second embodiment of the present invention. The three-dimensional structure verification supporting apparatus 101 includes a three-dimensional reconstruction image generating unit 140, a shading unit 141, a comparison image generating unit 130, a degree-of-coincidence computing unit 150, and an instruction unit 180.

The three-dimensional structure verification supporting apparatus 101 computes a three-dimensional reconstruction image using the three-dimensional reconstruction image generating unit 140 from a plurality of gray-scale images, which are projection images acquired by a projection image capturing apparatus such as a transmission electron microscope. Moreover, the three-dimensional structure verification supporting apparatus 101 generates a three-dimensionally shaded image, which is an example of the three-dimensional image, by shading the three-dimensional reconstruction image using the shading unit 141. Moreover, the three-dimensional structure verification supporting apparatus 101 generates a plurality of three-dimensional comparison images by adjusting image quality of the three-dimensionally shaded image with the image quality of the gray-scale image. Here, the image quality is adjusted by a lookup table of contrast, blurring (modulation of a frequency domain) or the like. Furthermore, the three-dimensional structure verification supporting apparatus 101 computes degree of image coincidence between the gray-scale image and the three-dimensional comparison image.

Here, the three-dimensional structure verification supporting apparatus 101 generates a plurality of three-dimensional comparison images by turning the three-dimensional reconstruction image to the angles at which the gray-scale images are acquired, respectively. Then, the three-dimensional structure verification supporting apparatus 101 computes the degree of image coincidence between the each of the three-dimensional comparison images and the gray-scale image corresponding to the three-dimensional comparison image, respectively.

That is, the three-dimensional structure verification supporting apparatus 101 is an apparatus for supporting reconstruction of an image by adjusting the image quality of the three-dimensional reconstruction image with the gray-scale image, from which the three-dimensional reconstruction image is generated, and facilitating the computation of the degree of image coincidence between the three-dimensional reconstruction image and the gray-scale image, i.e., it is an apparatus for supporting verification of the three dimensional structure of a substance indirectly.

Since the operation of the three-dimensional reconstruction image generating unit 140, the comparison image generating unit 130, and the degree-of-coincidence computing unit 150 is substantially the same as the three-dimensional structure verification supporting apparatus 100 according to the first embodiment, explanation will be omitted.

In addition to the operation in the first embodiment, the three-dimensional reconstruction image generating unit 140 selects one of the gray-scale images, turns the three-dimensional reconstruction image to the angle at which the gray-scale image is acquired, and outputs it to the shading unit 141. Moreover, the data processing unit 300 of the three-dimensional reconstruction image generating unit 140 changes and adjusts an extraction condition of the data, i.e., a reconstruction condition of the three-dimensional reconstruction image, according to an instruction from the instruction unit 180.

Moreover, the degree-of-coincidence computing unit 150 is different from that of the first embodiment in that it outputs the computed degree of image coincidence to the instruction unit 180.

The shading unit 141 shades the three-dimensional reconstruction image input from the three-dimensional reconstruction image generating unit 140. As the shading method of the shading unit 141, there is a method of drawing tangential lines on an object in an image from a virtual light source and increasing the density of a portion in an opposite side of the virtual light source, bounded by contacts of the object and the tangential lines. Alternatively, the density increases gradually.

The instruction unit 180 instructs the three-dimensional reconstruction image generating unit 140 to turn the three-dimensional reconstruction image to an angle at which another gray-scale image is acquired.

Moreover, the instruction unit 180 processes statistically a plurality of degrees of image coincidence computed under the same reconstruction condition corresponding to the plurality of gray-scale images, and instructs the data processing unit 300 of the three-dimensional reconstruction image generating unit 140 to change and adjust the reconstruction condition of the three-dimensional reconstruction image using the processing result.

For example, the statistical processing will be done by averaging. For example, when the average of the degrees of image coincidence is computed and when the average of the degrees of image coincidence is not greater than a predetermined reference value, the instruction unit 180 instructs the data processing unit 300 of the three-dimensional reconstruction image generating unit 140 to change and adjust the reconstruction condition of the three-dimensional reconstruction image.

Figure 17:
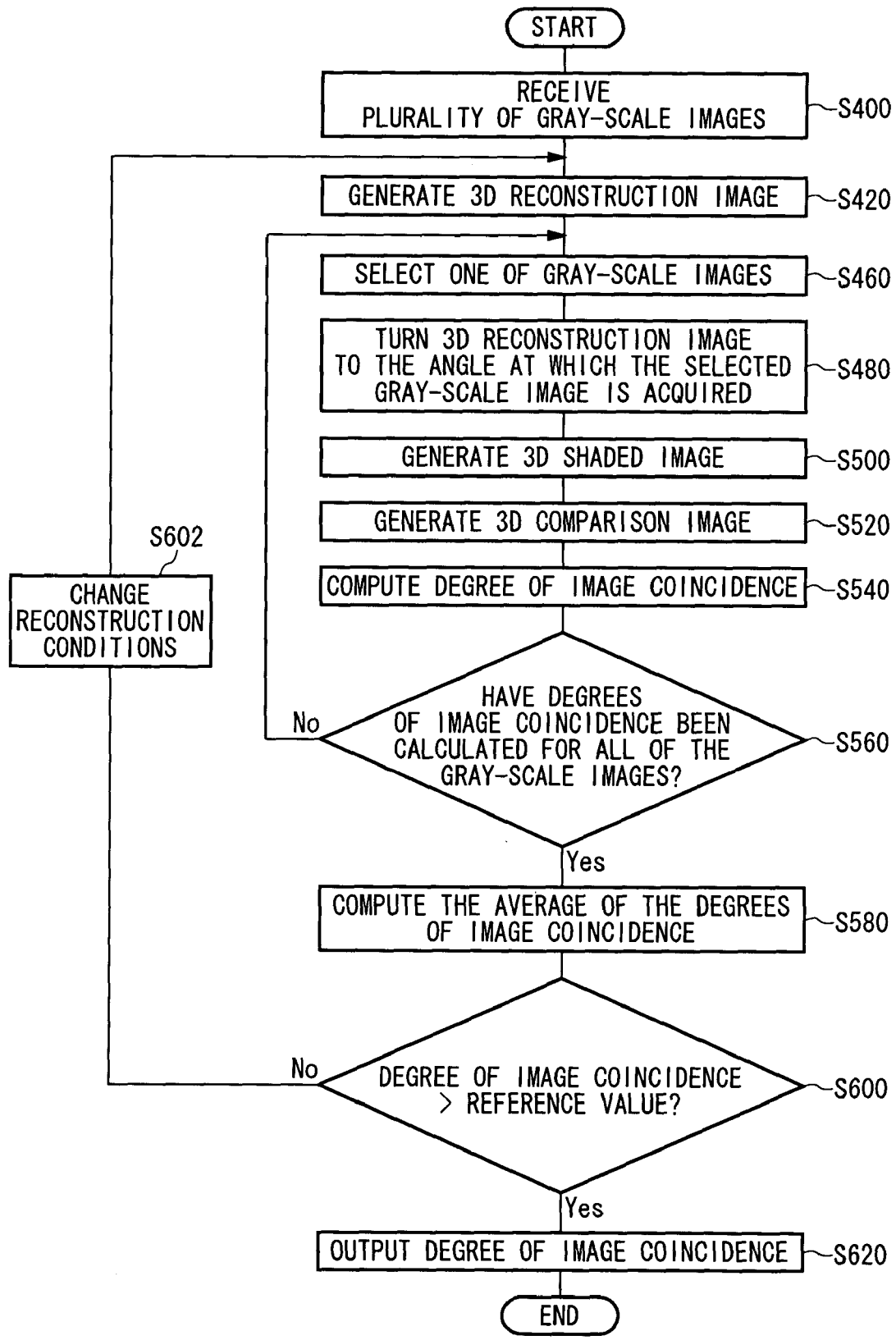
FIG. 17 is a flow chart exemplary showing operation of the three-dimensional structure verification supporting apparatus 101.

FIG. 17 is a flow chart exemplary showing operation of the three-dimensional structure verification supporting apparatus 101.

On receiving the plurality of gray-scale images (S400), the three-dimensional structure verification supporting apparatus 101 generates the three-dimensional reconstruction image using the three-dimensional reconstruction image generating unit 140 (S420).

Then, the three-dimensional structure verification supporting apparatus 101 selects one of the gray-scale images using the three-dimensional reconstruction image generating unit 140 (S460), and turns the three-dimensional reconstruction image to the angle at which the selected gray-scale image is acquired (S480).

Then, after the three-dimensional structure verification supporting apparatus 101 has shaded the three-dimensional reconstruction image using the shading unit 141 and has generated the three-dimensionally shaded image (S500), the three-dimensional structure verification supporting apparatus 101 generates the three-dimensional comparison image based on the three-dimensionally shaded image using the comparison image generating unit 130 (S520), and computes the degree of image coincidence using the degree-of-coincidence computing unit 150 (S540).

After computing the degrees of image coincidence by performing the steps from S460 to S540 for all of the gray-scale images (S560), the three-dimensional structure verification supporting apparatus 101 computes the average of the degrees of image coincidence using the instruction unit 180 (S580).

When the computed average of the degrees of image coincidence is not greater than the reference value (S600), the three-dimensional structure verification supporting apparatus 101 instructs the data processing unit 300 to change and adjust the reconstruction conditions using the instruction unit 180 (S602), and then performs the steps from S420 once again.

When the computed average of the degrees of image coincidence is greater than the reference value (S600), the degree of image coincidence is output (S620).

Therefore, properness of the reconstruction condition of the three-dimensional reconstruction image is quantitatively verifiable by the three-dimensional structure verification supporting apparatus 101. Here, since the three-dimensional structure verification supporting apparatus 101 computes and statistically processes the degrees of image coincidence with the plurality of gray-scale images, the properness of the reconstruction condition is verifiable more quantitatively.

Moreover, since hardware configuration of the three-dimensional structure verification supporting apparatus 101 is the same as that of the three-dimensional structure verification supporting apparatus 100 shown in FIG. 4 except for the provided software stored in a record medium, and software installed on the hard disk 618, explanation will be omitted. In addition, the provided software stored in the record medium includes: a comparison image generating module for realizing the comparison image generating unit 130; a degree-of-coincidence computing module for realizing the degree-of-coincidence computing unit 150; an instructions module for realizing the instruction unit 180; a distributing module for realizing the distributing unit 220; a second integrating module for realizing the second integrating unit 240; a shape computing module for realizing the shape computing unit 260; a first integrating module for realizing the first integrating unit 280; a data processing module for realizing the data processing unit 300; an image data generating module for realizing the image data generating unit 320; and an outputting module for realizing the outputting unit 360, as functional units. Since the operation of the modules which operates the CPU 602 of the computer depicted in FIG. 4 is the same as the function and operation of the corresponding components of the three-dimensional structure verification supporting apparatus 101 respectively, the explanation will be omitted.

Figure 18:
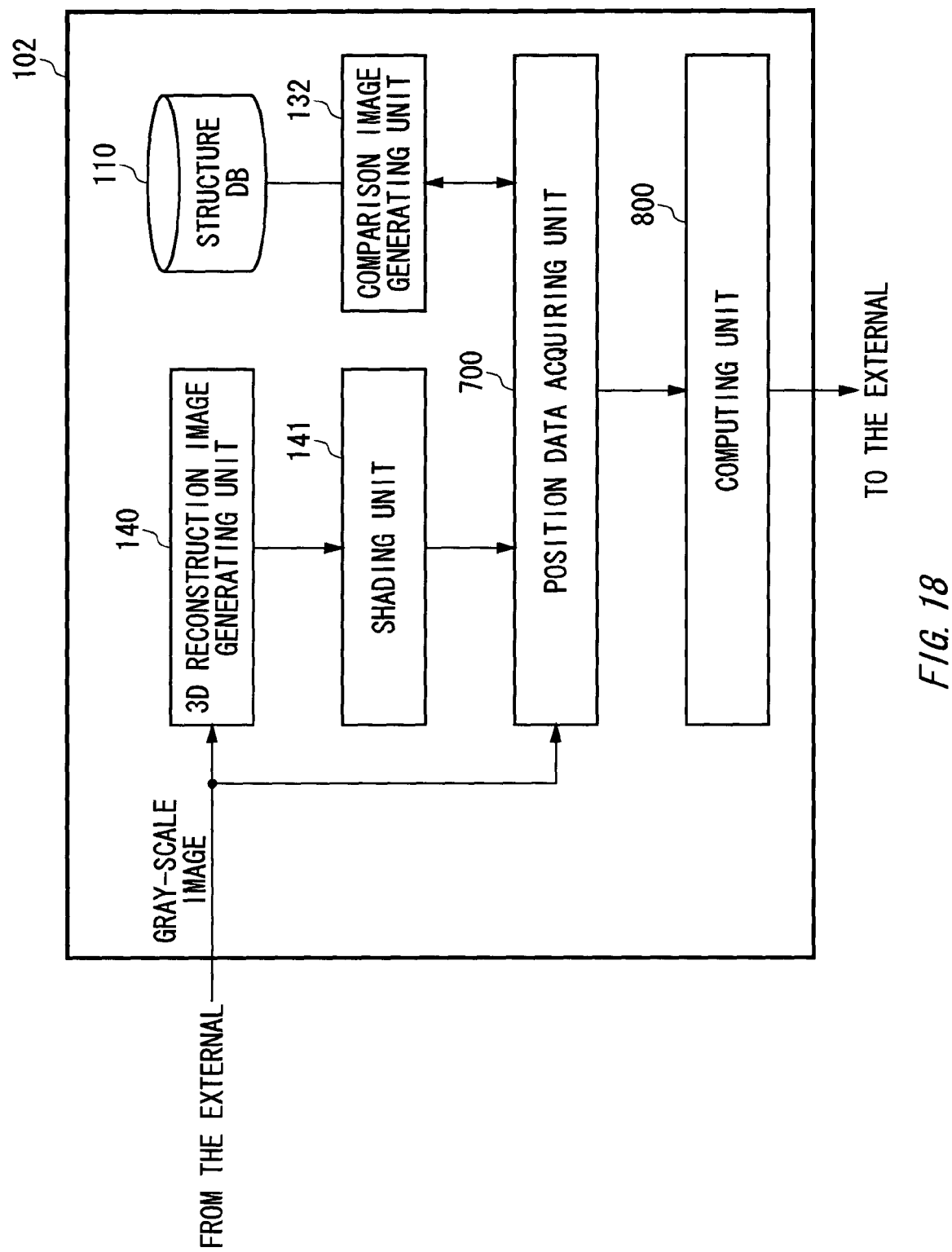
FIG. 18 is a block diagram showing a configuration of a three-dimensional structure verification supporting apparatus 102 according to a third embodiment.

FIG. 18 is a block diagram showing a configuration of a three-dimensional structure verification supporting apparatus 102 according to a third embodiment of the present invention. The three-dimensional structure verification supporting apparatus 102 includes a structure data base 110, a comparison image generating unit 132, a three-dimensional reconstruction image generating unit 140, a shading unit 141, a position data acquiring unit 700, and a computing unit 800. Since the structure data base 110, the three-dimensional reconstruction image generating unit 140 and the shading unit 141 have the same configuration as those of the three-dimensional structure verification supporting apparatus 101 depicted in FIG. 16, explanation will be omitted. In addition, the three-dimensionally shaded image generated by the shading unit 141 is output to a comparison position data acquiring unit 700. The three-dimensional structure verification supporting apparatus 102 is an apparatus for verifying the properness of the structural model by computing the degree-of-coincidence between a structural model, i.e., a simulated image, and an image indicating the structure of the substance acquired experimentally.

The comparison image generating unit 132 selects and acquires data indicating an image stored in the structure data base 110 according to an instruction from the external. Then, the comparison image generating unit 132 generates a three-dimensional comparison image by adjusting the image quality of the image indicated by the acquired data by filtering method, for example. Then, the three-dimensional comparison image is output to the position data acquiring unit 700.

The position data acquiring unit 700 acquires a plurality of comparison position data indicating positions in the three-dimensionally shaded image received from the shading unit 141, where the positions correspond to a plurality of parts on the substance. Moreover, the position data acquiring unit 700 acquires a plurality of reference position data, which indicate the positions of the above-mentioned plurality of parts, in the three-dimensional comparison image received from the comparison image generating unit 132. Then, the acquired data are output to the computing unit 800.

Alternatively, the position data acquiring unit 700 acquires data indicating each of the plurality of positions in the gray-scale image instead of the three-dimensionally shaded image as the plurality of reference position data.

The computing unit 800 computes the degree-of-coincidence between the three-dimensional comparison image and the three-dimensionally shaded image, i.e., the degree-of-coincidence between the structural model and the substance structure indicated by the three-dimensional reconstruction image, using the comparison position data and the reference position data received from the position data acquiring unit 700, and outputs it to the external.

That is, it is possible to select easily and quantitatively the structural model, which is the most similar to the experimentally acquired three-dimensional reconstruction image, by using the three-dimensional structure verification supporting apparatus 102. Moreover, when reconstructing the gray-scale image of the transmission electron microscope three-dimensionally, more accurate three-dimensional reconstruction image is acquirable than the conventional apparatus by reflecting the verification result of the three-dimensional structure verification supporting apparatus 102.

Figure 19:
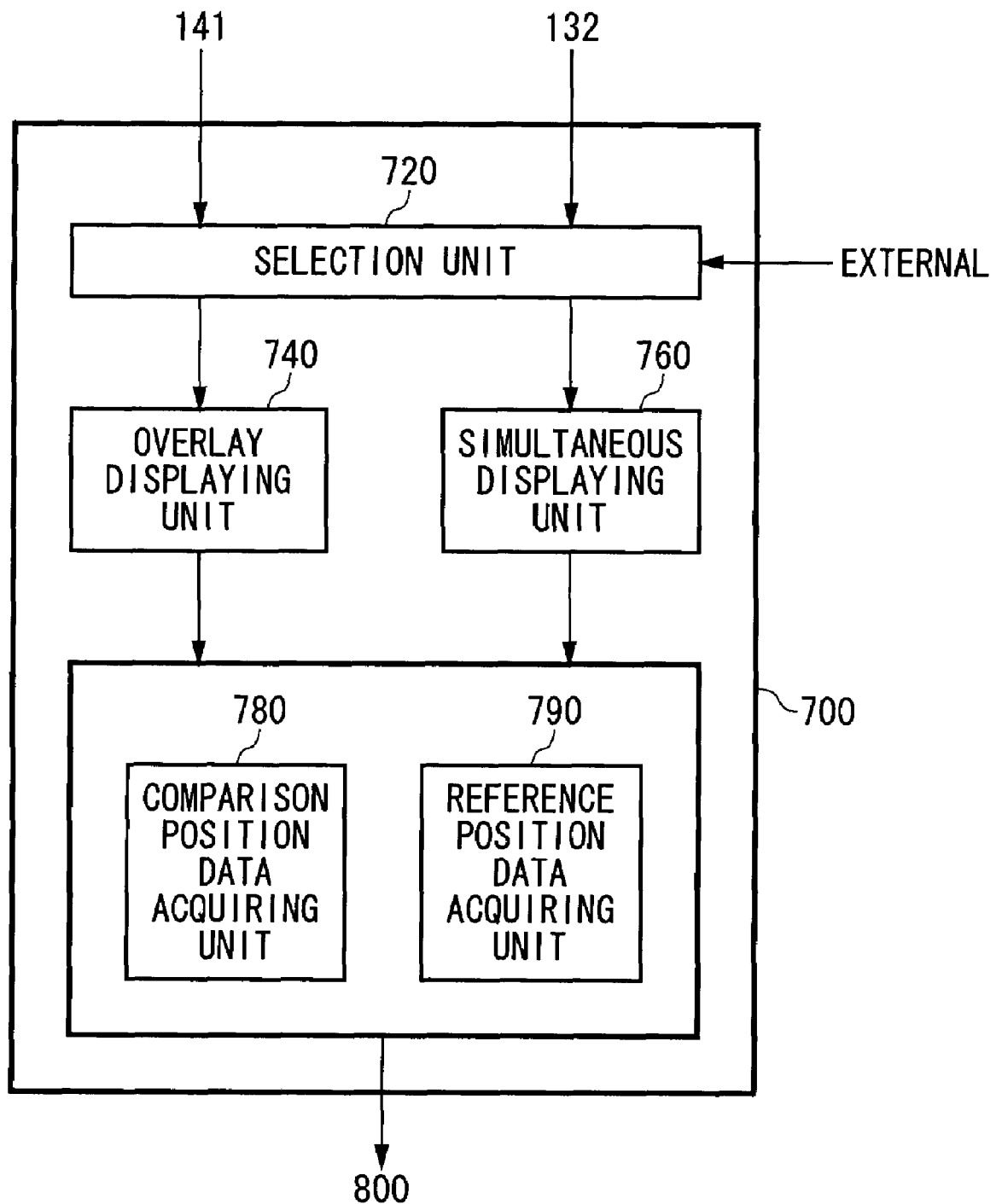
FIG. 19 is a block diagram exemplary showing a configuration of a position data acquiring unit 700.

FIG. 19 is a block diagram exemplary showing a configuration of the position data acquiring unit 700. In the embodiment, the position data acquiring unit 700 includes a selection unit 720, an overlay displaying unit 740, a simultaneous displaying unit 760, a comparison position data acquiring unit 780, and a reference position data acquiring unit 790.

For example, one of the overlay displaying unit 740 and the simultaneous displaying unit 760 is selected by the selection unit 720 for a destination of the gray-scale image or the three-dimensionally shaded image received from the shading unit 141, and the three-dimensional comparison image received from the comparison image generating unit 132 according to the instructions from the external. Alternatively, the selection unit 720 outputs the images to both the overlay displaying unit 740 and the simultaneous displaying unit 760.

The overlay displaying unit 740 displays the received three-dimensional comparison image, and the three-dimensionally shaded image or the gray-scale image in layers. Here, it is preferable that relative position of the three-dimensional comparison image, and the three-dimensionally shaded image or the gray-scale image is manually adjustable from the external. Furthermore, it is preferable that display angle and scale (size expansion/reduction) of at least either the three-dimensionally shaded image or the gray-scale image, or the three-dimensional comparison image is manually adjustable. Then, the overlay displaying unit 740 outputs the display position of the three-dimensional comparison image to the comparison position data outputting unit 780, and outputs the display position of the three-dimensionally shaded image or the gray-scale image to the reference position data outputting unit 780. On this occasion, the data indicating the display angle and the scale are also output with the images.

The simultaneous displaying unit 760 displays the received three-dimensional comparison image, and the three-dimensionally shaded image or the gray-scale image simultaneously. Here, it is preferable that the images are displayed up/down or left/right. Moreover, it is preferable that display angle and scale (size expansion/reduction) of at least either the three-dimensionally shaded image or the gray-scale image, or the three-dimensional comparison image is manually adjustable. Alternatively, after the display angles of the three-dimensionally shaded image or the gray-scale image, and the three-dimensional comparison image are aligned, the display angles of both the images are changed simultaneously when the display angle of one of the two images is changed. Alternatively, when the display angle of the gray-scale image is to be changed, the plurality of gray-scale images captured from a plurality of angles are displayed sequentially in order of angle. Moreover, both the three-dimensional comparison image, and the three-dimensionally shaded image or the gray-scale image may rotate continuously and synchronously on the simultaneous displaying unit 760. Then, the simultaneous displaying unit 760 outputs the display position of the three-dimensional comparison image to the comparison position data outputting unit 780, and outputs the display position of the three-dimensionally shaded image or the gray-scale image to the reference position data outputting unit 780. On this occasion, the data indicating the display angle and the scale are also output with the images.

The comparison position data acquiring unit 780 acquires the plurality of comparison position data indicating positions of the plurality of above-mentioned parts in the three-dimensional comparison image. The comparison position data acquiring unit 780 acquires the comparison position data by an input of a user through a pointer etc. Alternatively, single or a plurality of comparison position data is/are stored on the structure data base 110 in advance, and the comparison position data acquiring unit 780 acquires the comparison position data from the structure data base 110. Moreover, although the part is a point on the surface of the substance for example, it may be a position at which an atomic nucleus of an atom constituting part of the substance is presumed to exist. Moreover, the comparison position data are coordinate data or vector data of which the origin is located at the part. Then, the comparison position data acquiring unit 780 outputs the acquired comparison position data to the computing unit 800.

The reference position data acquiring unit 790 acquires the plurality of reference position data indicating positions of the plurality of above-mentioned parts of the three-dimensionally shaded image and the gray-scale image. For example, the reference position data acquiring unit 790 acquires comparison position data by an input of a user through a pointer etc. It is preferable that the input is input on the display screen of the overlay displaying unit 740, or on the display screen of the simultaneous displaying unit 760. Thereby, the user can select more suitable reference position and can input it as the reference position data. Moreover, the reference position data is coordinate data or vector data of which the origin is located at the part. It is preferable that the part of the reference position data is the same as the part of the comparison position data. Then, the comparison position data acquiring unit 780 outputs the acquired comparison position data to the computing unit 800.

It is difficult to acquire desired capturing direction or scale of the image by a measurement device, such as a transmission electron microscope. On the other hand, the position data acquiring unit 700 changes the scale and the angle of at least either the three-dimensionally shaded image or the gray-scale image, or the three-dimensional comparison image. Therefore, the comparison position data or the reference position data is set up more certainly.

Figure 20:
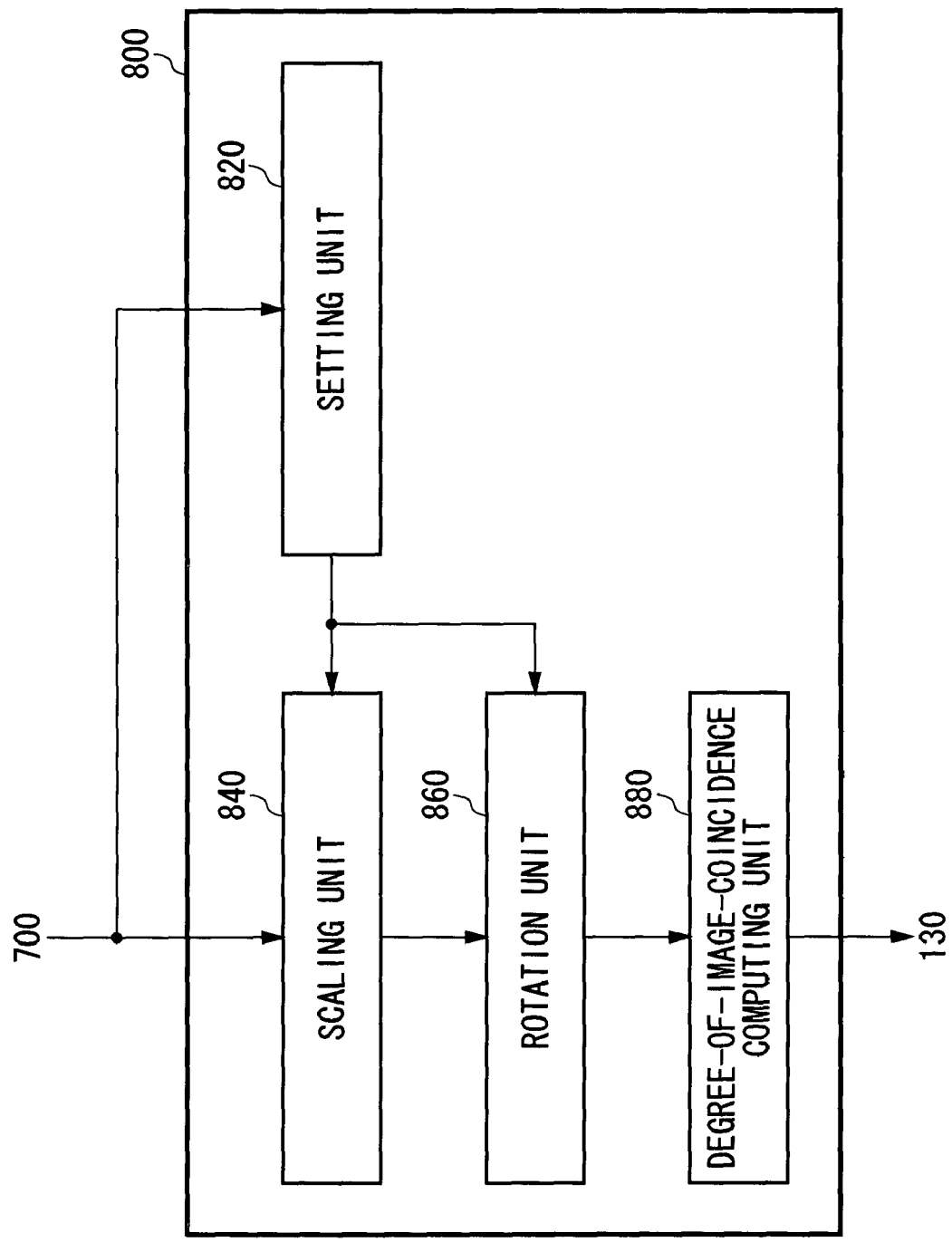
FIG. 20 is a block diagram exemplary showing a configuration of a computing unit 800.

FIG. 20 is a block diagram exemplary showing a configuration of the computing unit 800. The computing unit 800 includes a setting unit 820, a scaling unit 840, a rotation unit 860, and a degree-of-image-coincidence computing unit 880.

The setting unit 820 acquires the reference position data of the three-dimensionally shaded image and the reference position data of the gray-scale image while acquiring the comparison position data. Then, while computing difference between the reference position data and the comparison position data of the three-dimensionally shaded image for each of the parts, difference between the reference position data and the comparison position data of the gray-scale image for each of the parts is computed. Then, a set of equations, letting deviations of the images in the rotation direction and the parallel direction and deviation of the scale be unknowns, are set up for the above-mentioned two differences. Then, amount of correction in the rotation direction, amount of correction in the parallel direction, and amount of correction of the scale are computed by solving the two sets of equations using the method of least square. Then, the setting unit 820 outputs the amount of correction in the parallel direction, and the amount of correction of the scale to the scaling unit 840, and outputs the amount of correction in the rotation direction to the rotation unit 860.

Here, the setting unit 820 acquires amount of expansion or amount of reduction for one of the three-dimensional comparison image and the three-dimensionally shaded image from the exterior, and outputs it to the scaling unit 840. Moreover, the input unit 820 acquires amount of rotation of one of the three-dimensional comparison image and the three-dimensionally shaded image from the exterior, and outputs it to the rotation unit 860. For example, the exterior is another computing apparatus, a pointer, a keyboard, etc.

According to the data received from the setting unit 820, the scaling unit 840 expands or reduces one of the three-dimensionally shaded image or the gray-scale image, and the three-dimensional comparison image in accordance with the other image, and moves them in parallel. On this occasion, the scaling unit 840 changes the comparison position data and the reference position data in accordance with the amounts of expansion/reduction and the amount of parallel displacement of the three-dimensional comparison image or the three-dimensionally shaded image so that relative position of the images are maintained. Then, the scaling unit 840 outputs the three-dimensionally shaded image or the gray-scale image, the three-dimensional comparison image, the comparison position data, and the reference position data after the expansion or the reduction to the rotation unit 860 with the amount of the rotation.

The rotation unit 860 rotates one of the three-dimensionally shaded image or the gray-scale image, and the three-dimensional comparison image received from the scaling unit 840 according to the data received from the setting unit 820. On this occasion, the scaling unit 840 also changes the comparison position data or the reference position data of the image according to the amount of rotation of the image. Then, the scaling unit 840 outputs the comparison position data and the reference position data after the rotation to the degree-of-image-coincidence computing unit 880.

The degree-of-image-coincidence computing unit 880 computes the degree-of-coincidence between the comparison position data and the reference position data received from the rotation unit 860 as degrees of coincidence between the three-dimensionally shaded image or the gray-scale image, and the three-dimensional comparison image. For example, the degree-of-image-coincidence computing unit 880 computes an error of each of the comparison position data and the reference position data by the method of least square, and lets an inverse number of the error be the degree of image coincidence. However, the degree of image coincidence is not limited to the inverse number of the error, but it may be a value varying inversely with the error. Then, the degree-of-image-coincidence computing unit 880 outputs the computed degree of image coincidence to the external.

Alternatively, when the degree of image coincidence is not greater than a predetermined value, the degree-of-image-coincidence computing unit 880 instructs the rotation unit 860 or the scaling unit 840 to change the amount of rotation, or the amount of expansion or the amount of reduction. In this case, the rotation unit 860 changes the amount of rotation of the three-dimensionally shaded image or the gray-scale image, or the three-dimensional comparison image, and outputs it to the degree-of-image-coincidence computing unit 880 once again. Moreover, the scaling unit 840 changes the amount of expansion or the amount of reduction of the three-dimensionally shaded image or the gray-scale image, or the three-dimensional comparison image, and outputs it to the degree-of-image-coincidence computing unit 880 through the rotation unit 860 once again.

Moreover, as described above, it is difficult to acquire desired capturing direction or scale of the image by a measurement device, such as a transmission electron microscope. On the other hand, the computing unit 800 changes the scale and the angle of at least one of the three-dimensionally shaded image or the gray-scale image, and the three-dimensional comparison image. Therefore, the degree of image coincidence is computable more accurately to verify the structural model.

Figure 21:
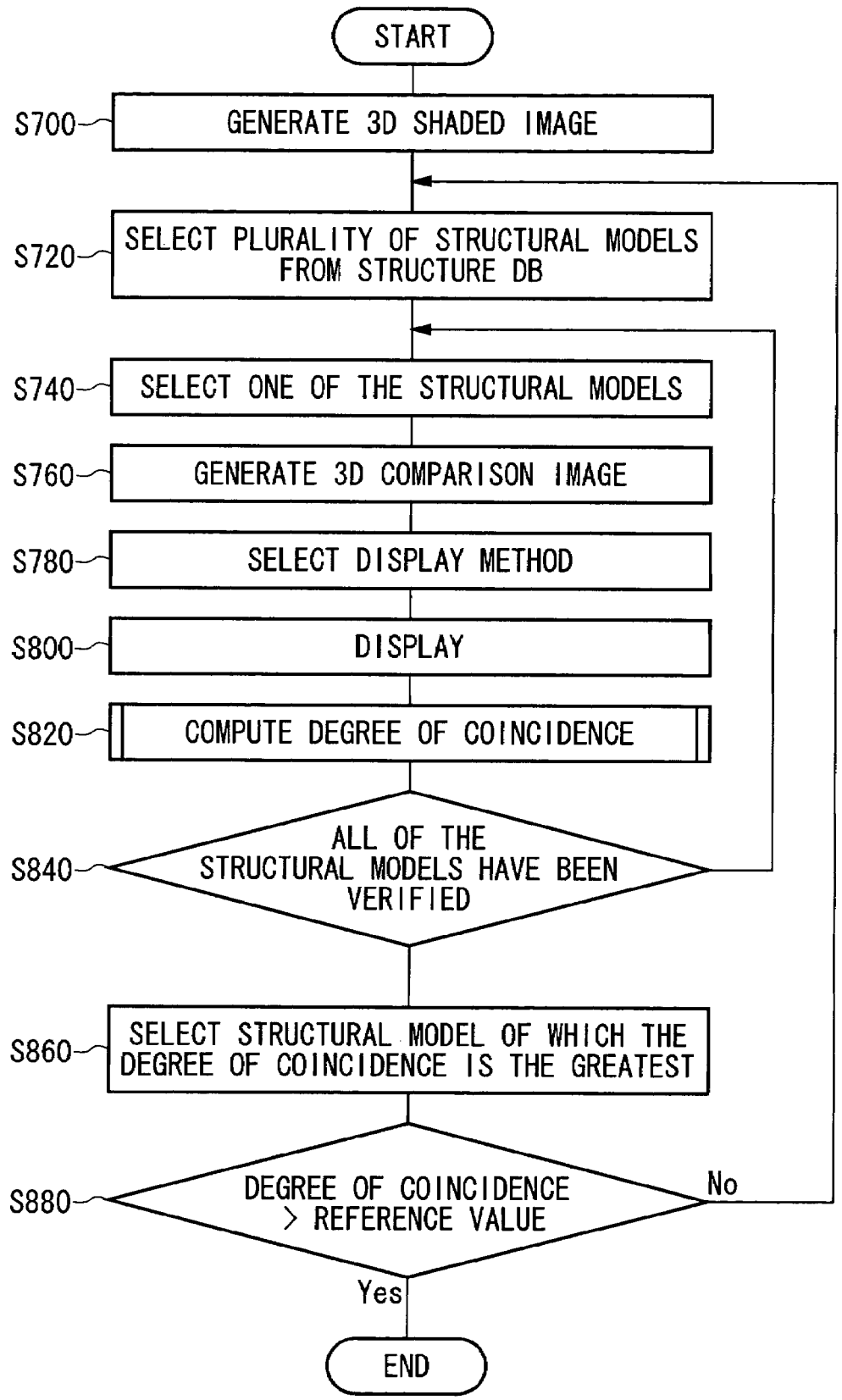
FIG. 21 is a flowchart exemplary showing operation of the three-dimensional structure verification supporting apparatus 102.

FIG. 21 is a flowchart exemplary showing operation of the three-dimensional structure verification supporting apparatus 102.

First, the three-dimensional reconstruction image generating unit 140 generates the three-dimensional reconstruction image, and then the shading unit 141 generates the three-dimensionally shaded image (S700). Then, after selecting the plurality of structural models from the structure data base 110 (S720), the comparison image generating unit 132 further selects one of the structural models (S740). Then, the image processing is performed on the image of the selected structural model, and the three-dimensional comparison image is generated (S760). Then, after a user selects the display method through the input unit 820 (S780), the overlay displaying unit 740 or the simultaneous displaying unit 760 displays the images according to the selected display method (S800).

Then, the computing unit 800 computes the degree of image coincidence (S820).

Then, the steps from S740 to S820 are performed for all of the structural models selected in S720 (S840). Then, the computing unit 800 selects the structural model, of which the degree of image coincidence is the greatest above all (S860), and judges whether the degree of image coincidence is greater than a reference value (S880). If it is greater than the reference value, the processing is ended. If it is not greater than the reference value, it returns to S720 and a structural model is reselected.

According to the embodiment, the number of the structural models for the computation of the degree of coincidence is limited in S720. That is, since not all the structures in the structure data base 110 are selected for the computation, load to the three-dimensional structure verification supporting apparatus is reduced.

Figure 22:
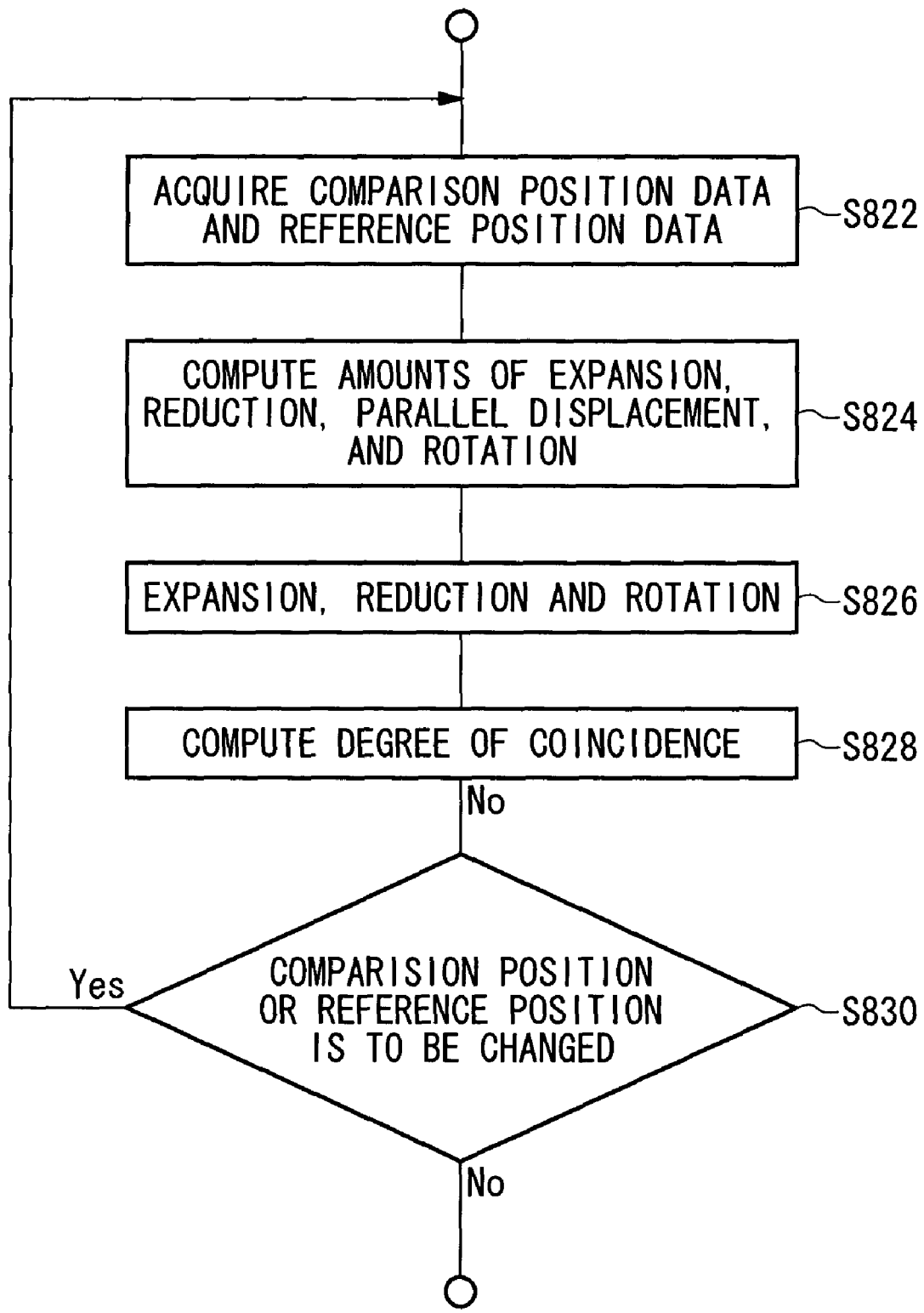
FIG. 22 is a flowchart exemplary showing detailed operation of S820 depicted in FIG. 21.

FIG. 22 is a flowchart exemplary showing detailed operation of S820 depicted in FIG. 21. First, the comparison position data acquiring unit 780 acquires the comparison position data, and the reference position data acquiring unit 790 acquires the reference position data of the gray-scale image while acquiring the reference position data of the three-dimensionally shaded image (S822). Then, while the setting unit 820 computes the amount of expansion or the amount of reduction, and the amount of parallel displacement, the rotation unit 860 computes the amount of rotation (S824). While the scaling unit 840 expands or reduces the three-dimensionally shaded image or the gray-scale image, or the three-dimensional comparison image, the rotation unit rotates it (S826). Then, the degree-of-image-coincidence computing unit 880 computes the degree of coincidence (S828). Then, it is judged whether the comparison position data or the reference position data is to be changed (S830). If so, it returns to S822.

In addition, since hardware configuration of the three-dimensional structure verification supporting apparatus 102 is the same as that of the three-dimensional structure verification supporting apparatus 100 shown in FIG. 4 except for the provided software stored in a record medium, and software installed on the hard disk 618, explanation will be omitted. In addition, the provided software stored in the record medium includes a three-dimensional reconstruction image generating module, a shading module, a comparison position data acquiring module, a selection module, an overlay displaying module, a simultaneous module, a comparison position data acquiring module, a reference position data acquiring module, an input module, a scaling module, a rotation module, and a degree-of-image-coincidence computing module as functional units. Since the operation of the modules which operates the CPU 602 of the computer depicted in FIG. 4 is the same as the function and operation of the corresponding components of the three-dimensional structure verification supporting apparatus 102 respectively, the explanation will be omitted.

Although the present invention has been described by way of exemplary embodiment, it should be understood that many changes and substitutions may be made by those skilled in the art without departing from the spirit and the scope of the present invention which is defined only by the appended claims. It is also obvious that a part of the function of each of the components may be carried out by a person. Moreover, it is also obvious that the apparatuses depicted in each of the embodiments may be combined together.

As apparent from the above description, according to the present invention, there is provided a three-dimensional structure verification supporting apparatus, a three-dimensional structure verification method, a record medium, and a program suitable for supporting verification of properness of three-dimensional simulated images, such as an estimated model or a three-dimensional reconstruction image of a structure of a substance.

What is claimed is:

1. A three-dimensional structure verification supporting apparatus for supporting verification of a three dimensional structure by verifying properness of a three-dimensional image indicating the three dimensional structure of a substance, comprising:

a three-dimensional reconstruction image generating unit for generating a three-dimensional reconstruction image by processing a plurality of gray-scale images acquired by a transmission electron microscope;

a shading unit for generating a three-dimensionally shaded image, which is the three-dimensional image, by shading the three-dimensional reconstruction image;

a comparison image generating unit for generating a three-dimensional comparison image by adjusting image quality of the three-dimensionally shaded image with image quality of a reference image of the substance which is obtained experimentally; and a degree-of-image coincidence computing unit for computing degree of image coincidence between the three-dimensional comparison image and the three-dimensional reconstruction image.

2. The three-dimensional structure verification supporting apparatus as claimed in claim 1, wherein said comparison image generating unit generates the three-dimensional comparison image by blurring the three-dimensional image in accordance with image quality of the reference image of the substance.

3. The three-dimensional structure verification supporting apparatus as claimed in claim 1, wherein said comparison image generating unit generates the three-dimensional comparison image in accordance with the image quality of the reference image of the substance which is obtained experimentally by adjusting the image quality so that the degree of image coincidence between a three-dimensional image of a reference substance, of which a structure is known, and the reference image of the reference substance obtained by experimental structural analysis becomes the greatest.

4. The three-dimensional structure verification supporting apparatus as claimed in claim 1, wherein the three-dimensional image is a three-dimensional simulated image simulated by modeling in order to indicate three dimensional structure of a substance.

5. A three-dimensional structure verification supporting apparatus for supporting verification of a three dimensional structure by verifying properness of a three-dimensional image indicating the three dimensional structure of a substance, comprising:

a comparison image generating unit for generating a three-dimensional comparison image by adjusting image quality of the three-dimensional image with image quality of a reference image of the substance which is obtained experimentally;

a degree-of-image coincidence computing unit for computing degree of image coincidence between the three-dimensional comparison image and the reference image of the substance;

a simulated-image supply unit for supplying said comparison image generating unit with a plurality of three-dimensional simulated images indicating a plurality of structures which are to be formed by the substance, wherein said comparison image generating unit generates the three-dimensional comparison image for each of the plurality of three-dimensional simulated images, and said degree-of-image-coincidence computing unit computes the degree of image coincidence for each of the plurality of three-dimensional comparison images;

wherein the three-dimensional image is a three-dimensional simulated image simulated by modeling in order to indicate three dimensional structure of a substance.

6. The three-dimensional structure verification supporting apparatus as claimed in claim 5, further comprising a structure data base storing thereon data indicating the plurality of structures, which are to be formed by the substance, as images, wherein said simulated-image supply unit acquires the three-dimensional simulated image using the data stored on said structure data base, and provides it to said comparison image generating unit.

7. The three-dimensional structure verification supporting apparatus as claimed in claim 5, further comprising a selection unit for selecting data for specifying a structure of a substance corresponding to the three-dimensional comparison image, of which the degree of image coincidence is judged to be the greatest, from a plurality of data specifying the plurality of structures.

8. The three-dimensional structure verification supporting apparatus as claimed in claim 7, wherein said comparison image generating unit generates the plurality of three-dimensional comparison images captured from a plurality of angles for each of the plurality of structures, said degree-of-coincidence computing unit computes degree of image coincidence between each of the plurality of three-dimensional comparison images captured from a plurality of angles, and the reference image of the substance captured from the same angle as each of the plurality of three-dimensional comparison images, for each of the plurality of structures, and said selection unit judges acceptability of the degree of image coincidence using the result of the statistical application of the plurality of degrees of image coincidence for a plurality of angles.

9. The three-dimensional structure verification supporting apparatus as claimed in claim 4, further comprising a three-dimensional reconstruction image generating unit for generating a three-dimensional reconstruction image, which is a reference image of the substance, by processing a plurality of gray-scale images acquired by a transmission electron microscope.

10. The three-dimensional structure verification supporting apparatus as claimed in claim 1, wherein said comparison image generating unit generates the three-dimensional comparison image using the three-dimensionally shaded image; and said degree-of-coincidence computing unit utilizes at least one gray-scale image acquired by the transmission electron microscope as a reference image of the substance.

11. The three-dimensional structure verification supporting apparatus as claimed in claim 10, wherein said three-dimensional reconstruction image generating unit turns the three-dimensional reconstruction image to an angle at which one of the plurality of gray-scale images is captured, and said degree-of-coincidence computing unit computes the degree of image coincidence between the three-dimensional comparison image and the one of the gray-scale images.

12. The three-dimensional structure verification supporting apparatus as claimed in claim 11, wherein said comparison image generating unit generates a plurality of three-dimensional comparison images corresponding to the plurality of gray-scale images, said degree-of-coincidence computing unit computes the plurality of degrees of image coincidence using the plurality of three-dimensional comparison images, and the three-dimensional structure verification supporting apparatus further comprises an instruction unit for statistically processing the plurality of degrees of image coincidence and instructing said three-dimensional reconstruction image generating unit to adjust reconstruction condition of the three-dimensional reconstruction image using the processing result.

13. The three-dimensional structure verification supporting apparatus as claimed in claims 9 or 10, further comprising a three-dimensional reconstruction image generating unit, comprising:

a shape computing unit for computing shape data indicating an outline of the substance using the gray-scale images captured from a plurality of angles;

a distributing unit for generating a gray-scale density-distribution by extending and distributing density indicated in the plurality of gray-scale images to the angles at which the gray-scale images are captured, respectively;

a second integrating unit for generating three-dimensional gray-scale data by integrating the plurality of gray-scale density-distribution generated from the plurality of gay-scale images captured from the plurality of angles and indicating the substance by three-dimensional image data;

a first integrating unit for integrating the three-dimensional gray-scale data generated by said second integrating unit and the shape data; and a data processing unit for generating the three-dimensional reconstruction image from the three-dimensional gray-scale data by extracting only the gray-scale data which exists in a circumference of a shape indicated by the shape data.

14. The three-dimensional structure verification supporting apparatus as claimed in claims 9 or 10, further comprising a three-dimensional reconstruction image generating unit, comprising:

a shape computing unit for computing shape data indicating the outline of the substance using the gray-scale images captured from a plurality of angles; and an image data generating unit for generating the three-dimensional reconstruction image by distributing the gray-scale data of the gray-scale images around the outline.

15. The three-dimensional structure verification supporting apparatus as claimed in claim 1, further comprising:

a comparison position data acquiring unit for acquiring a plurality of comparison position data indicating positions of a plurality of parts of the substance in the three-dimensional image; and a reference position data acquiring unit for acquiring a plurality of reference position data indicating positions of the plurality of parts in the reference image, wherein said degree-of-image-coincidence computing unit computes the degree of image coincidence using the plurality of comparison position data and the plurality of reference position data.

16. The three-dimensional structure verification supporting apparatus as claimed in claim 15, further comprising a scaling unit for scaling one of the plurality of comparison position data and the plurality of reference position data into a state where the three-dimensional image or the reference image is expanded or reduced, wherein said degree-of-image-coincidence computing unit computes the degree of image coincidence using the one of the plurality of comparison position data and the plurality of reference position data scaled by said scaling unit, and the other one of the plurality of comparison position data and the plurality of reference position data.

17. The three-dimensional structure verification supporting apparatus as claimed in claim 15, further comprising a rotation unit for rotating one of the plurality of reference position data and the plurality of comparison position data into a state where the three-dimensional image or the reference image is rotated, wherein said degree-of-image-coincidence computing unit computes the degree of image coincidence using the one of the plurality of comparison position data and the plurality of reference position data rotated by said rotating unit, and the other one of the plurality of comparison position data and the plurality of reference position data.

18. The three-dimensional structure verification supporting apparatus as claimed in claim 15, wherein a three-dimensional simulated image computed by modeling is utilized for indicating three dimensional structure of the substance as the three-dimensional image, and a three-dimensional reconstruction image obtained by processing a plurality of gray-scale images acquired by a transmission electron microscope, or one of the gray-scale images, is utilized as a reference image of the substance.

19. The three-dimensional structure verification supporting apparatus as claimed in claim 18, further comprising a shading unit for generating a three-dimensionally shaded image by shading the three-dimensional reconstruction image, wherein said comparison image generating unit utilizes the three-dimensionally shaded image as the reference image.

20. The three-dimensional structure verification supporting apparatus as claimed in claim 18, further comprising a simultaneous displaying unit for displaying a rotating three-dimensional reconstruction image, or for displaying the three-dimensional comparison image rotationally in accordance with the three-dimensional comparison image or the gray-scale image while displaying the plurality of gray-scale images captured from a plurality of angles sequentially in the order of angles, wherein said reference position data acquiring unit acquires the reference position from a screen display of said parallel displaying unit.

21. A three-dimensional structure verification supporting method for supporting verification of a three dimensional structure by verifying properness of a three-dimensional image indicating the three dimensional structure of a substance, comprising steps of:

generating a three-dimensional reconstruction image by processing a plurality of gray-scale images acquired by a transmission electron microscope;

generating a three-dimensionally shaded image, which is the three-dimensional image, by shading the three-dimensional reconstruction image;

generating a three-dimensional comparison image by adjusting image quality of the three-dimensionally shaded image with image quality of a reference image of the substance which is obtained experimentally; and computing degree of image coincidence between the three-dimensional comparison image and the three-dimensional reconstruction image.

22. The three-dimensional structure verification supporting method as claimed in claim 21 further comprising a step of generating the three-dimensional comparison image in accordance with the image quality of the reference image of the substance which is obtained experimentally by adjusting the image quality so that the degree-of-image coincidence between a three-dimensional image of a reference substance, of which the structure is known, and the reference image of the reference substance obtained by experimental structural analysis becomes the greatest.

23. The three-dimensional structure verification supporting method as claimed in claim 21, wherein the three-dimensional image is a three-dimensional simulated image simulated to indicate a three dimensional structure of a substance.

24. A three-dimensional structure verification supporting method for supporting verification of a three dimensional structure by verifying properness of a three-dimensional image indicating the three dimensional structure of a substance, comprising steps of:

generating a three-dimensional comparison image by adjusting image quality of the three-dimensional image with image quality of a reference image of the substance which is obtained experimentally;

computing degree of image coincidence between the three-dimensional comparison image and the reference image of the substance;

generating a plurality of three-dimensional comparison images using the plurality of three-dimensional simulated images indicating a plurality of structures which are to be formed by the substance;

computing the degree of image coincidence for each of the plurality of three-dimensional comparison images; and estimating the structure used as a basis of the three-dimensional comparison image, of which the degree of image coincidence is the greatest, to be a structure of the substance;

wherein the three-dimensional image is a three-dimensional simulated image simulated to indicate a three dimensional structure of a substance.

25. The three-dimensional structure verification supporting method as claimed in claim 23, wherein the reference image of the substance is a three-dimensional reconstruction image obtained by processing a plurality of gray-scale images acquired by a transmission electron microscope.

26. The three-dimensional structure verification supporting method as claimed in claim 21, further comprising steps of:

generating a three-dimensional reconstruction image by processing a plurality of gray-scale images acquired by a transmission electron microscope;

generating a three-dimensionally shaded image, which is the three-dimensional image, by shading the three-dimensional reconstruction image;

generating the three-dimensional comparison image using the three-dimensionally shaded image; and computing a degree of image coincidence between the three-dimensional comparison image and the gray-scale image, which is a reference image of the substance.

27. The three-dimensional structure verification supporting method as claimed in claim 26, further comprising steps of:

generating the three-dimensional comparison image by turning the three-dimensional reconstruction image to an angle at which one of the plurality of gray-scale images is captured; and computing the degree of image coincidence between the three-dimensional comparison image and the one of the gray-scale image.

28. The three-dimensional structure verification supporting method as claimed in claim 26, further comprising steps of:

computing a plurality of degrees of image coincidence by generating a plurality of three-dimensional comparison images corresponding to the plurality of gray-scale images;

statistically processing the plurality of degrees of image coincidence; and adjusting reconstruction condition of the three-dimensional reconstruction image using a processing result.

29. The three-dimensional structure verification supporting method as claimed in claims 25 or 26, further comprising steps of:

simulating shape data indicating an outline of the substance using the plurality of gray-scale images captured by a transmission electron microscope from a plurality of angles;

generating a gray-scale density-distribution by extending and distributing density indicated in the plurality of gray-scale images to the angles at which the gray-scale images are captured, respectively;

generating three-dimensional gray-scale data by integrating the plurality of gray-scale density-distribution generated from the plurality of gray-scale images captured from the plurality of angles and by indicating the substance by three-dimensional image data; and integrating the three-dimensional gray-scale data and the shape data, and generating the three-dimensional reconstruction image from the three-dimensional gray-scale data by extracting only the gray-scale data which exists in a circumference of an outline indicated by the shape data.

30. The three-dimensional structure verification supporting method as claimed in claims 25 or 26, further comprising steps of:

simulating shape data indicating the outline of the substance using the plurality of gray-scale images captured by a transmission electron microscope from a plurality of angles;

simulating shape data indicating the outline of the substance using the plurality of gray-scale images of the substance captured from a plurality of angles; and generating the three-dimensional reconstruction image by distributing the gray-scale data of the gray-scale image of the substance captured by the transmission electron microscope around the outline.

31. A computer-readable medium comprising instructions for executing a program for supporting verification of a three dimensional structure by verifying properness of a three-dimensional image indicating a three dimensional structure of a substance, comprising:

a three-dimensional reconstruction image generating module for generating a three-dimensional reconstruction image by processing a plurality of gray-scale images acquired by a transmission electron microscope;

a shading module for generating a three-dimensionally shaded image, which is the three-dimensional image, by shading the three-dimensional reconstruction image;

a comparison image generating module for generating a three-dimensional comparison image by adjusting image quality of the three-dimensionally shaded image with image quality of a reference image of the substance which is obtained experimentally; and a degree-of-image-coincidence computing module for computing a degree of image coincidence between the three-dimensional comparison image and the three-dimensional reconstruction image acquired by experimental structural analysis.

32. The computer-readable medium as claimed in claim 31, further comprising;

a three-dimensional image supply module for supplying said comparison image generating module with the plurality of three-dimensional images indicating a plurality of structures which are to be formed by the substance, wherein said degree-of-image-coincidence computing module computes the degree of image coincidence for each of the plurality of three-dimensional comparison images; and the program further comprises a selection module for selecting data for specifying the structure of the substance to be used as a basis of the three-dimensional comparison image, of which the degree of image coincidence is the greatest, from a plurality of data specifying the plurality of structures.

33. The three-dimensional structure verification supporting apparatus as claimed in claim 4, further comprising a simulated-image supply unit for supplying said comparison image generating unit with a plurality of three-dimensional simulated images indicating a plurality of structures which are to be formed by the substance, wherein said comparison image generating unit generates the three-dimensional comparison image for each of the plurality of three-dimensional simulated images, and said degree-of-image-coincidence computing unit computes the degree of image coincidence for each of the plurality of three-dimensional comparison images.

34. The three-dimensional structure verification supporting method as claimed in claim 23, further comprising steps of:

generating a plurality of three-dimensional comparison images using the plurality of three-dimensional simulated images indicating a plurality of structures which are to be formed by the substance;

computing the degree of image coincidence for each of the plurality of three-dimensional comparison images; and estimating the structure used as a basis of the three-dimensional comparison image, of which the degree of image coincidence is the greatest, to be a structure of the substance.

* * * * *